United States Patent
Wu

(10) Patent No.: US 12,204,813 B2
(45) Date of Patent: Jan. 21, 2025

(54) METHOD, SERVER, AND STORAGE MEDIUM FOR REDUCING AUDIO DATA TRANSMISSION DELAY

(71) Applicant: Tencent Technology (Shenzhen) Company Limited, Shenzhen (CN)

(72) Inventor: Jiaping Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 364 days.

(21) Appl. No.: 17/737,886

(22) Filed: May 5, 2022

(65) Prior Publication Data

US 2022/0261217 A1 Aug. 18, 2022

Related U.S. Application Data

(63) Continuation of application No. PCT/CN2021/097794, filed on Jun. 2, 2021.

(30) Foreign Application Priority Data

Jul. 23, 2020 (CN) .......................... 202010716978.3

(51) Int. Cl.
G06F 3/16 (2006.01)
(52) U.S. Cl.
CPC .................... G06F 3/165 (2013.01)
(58) Field of Classification Search
CPC ................ G06F 3/165; G06F 3/162
See application file for complete search history.

(56) References Cited

U.S. PATENT DOCUMENTS

2003/0028363 A1* 2/2003 Nobili .................... G06F 21/51
704/1

FOREIGN PATENT DOCUMENTS

CN 103023872 A 4/2013
CN 104093046 A 10/2014
(Continued)

OTHER PUBLICATIONS

Tencent Technology, Japanese Office Action, JP Patent Application No. 2022-548829, Nov. 28, 2023, 7 pgs.
(Continued)

*Primary Examiner* — Joseph Saunders, Jr.
(74) *Attorney, Agent, or Firm* — Morgan, Lewis & Bockius LLP

(57) ABSTRACT

A server system includes a cloud application program, a system framework, a forwarding program, and an audio capturing program. The server system inputs first audio data of the cloud application program to the system framework, processes the first audio data through the system framework to obtain second audio data, and transmits the second audio data to the forwarding program. The second audio data is then transmitted from the forwarding program to the audio capturing program according to a communication connection between the forwarding program and the audio capturing program. The audio capturing program transmits the second audio data to a local application program of a terminal. Because the second audio data obtained after processing through the system framework is directly sent to the audio capturing program through the forwarding program, a transmission link of audio data is shortened, thus reducing the delay in delivering audio data.

19 Claims, 13 Drawing Sheets

(56) References Cited

FOREIGN PATENT DOCUMENTS

| CN | 105491021 | A | 4/2016 |
|---|---|---|---|
| CN | 106961421 | A | 7/2017 |
| CN | 109947387 | A | 6/2019 |
| CN | 110034828 | A | 7/2019 |
| CN | 106961421 | B | 10/2019 |
| CN | 110694267 | A | 1/2020 |
| CN | 110841278 | A | 2/2020 |
| CN | 111294438 | A | 6/2020 |
| CN | 111324576 | A | 6/2020 |
| CN | 111596885 | A | 8/2020 |
| EP | 3174060 | A1 | 10/2019 |
| JP | 2016532890 | A | 10/2016 |
| WO | WO 2012086917 | A2 | 6/2012 |

OTHER PUBLICATIONS

Tencent Technology, IPRP, PCT/CN2021/097794, Jan. 24, 2023, 6 pgs.
Tencent Technology, Extended European Search Report and Supplementary Search Report, EP20770930.4, Jan. 3, 2023, 13 pgs.
Tencent Technology, WO, PCT/CN2021/097794, Aug. 27, 2021, 5 pgs.
Tencent Technology, Indian Office Action, IN Patent Application No. 202247027655, Mar. 1, 2024, 8 pgs.
Tencent Technology, ISR, PCT/CN2021/097794, Aug. 23, 2021, 3 pgs.
Tencent Technology, Korean Office Action, KR Patent Application No. 10-2022-7017498, Aug. 20, 2024, 14 pgs.

\* cited by examiner

METHOD, SERVER, AND STORAGE MEDIUM FOR REDUCING AUDIO DATA TRANSMISSION DELAY

CROSS-REFERENCE TO RELATED APPLICATIONS

This application is a continuation application of PCT Patent Application No. PCT/CN2021/097794, entitled "AUDIO DATA PROCESSING METHOD, SERVER, AND STORAGE MEDIUM" filed on Jun. 2, 2021, which claims priority to Chinese Patent Application No. 202010716978.3, filed with the State Intellectual Property Office of the People's Republic of China on Jul. 23, 2020, and entitled "AUDIO DATA PROCESSING METHOD, SERVER, AND STORAGE MEDIUM", all of which are incorporated herein by reference in their entirety.

FIELD OF THE TECHNOLOGY

This application relates to the field of computer technologies, and in particular, to audio data processing.

BACKGROUND OF THE DISCLOSURE

A cloud application program is an application program running on a server. The server runs the cloud application program to generate corresponding audio data, and delivers the audio data to a local application program of a terminal for playback. The local application program of the terminal only needs to play the audio data.

Currently, the server provides an audio record interface for an audio capturing program. When the cloud application program runs, the server records audio data through a record thread. The audio capturing program may invoke the audio record interface to read the recorded audio data from the record thread, and then send the audio data to the local application program of the terminal.

SUMMARY

According to one aspect, an embodiment of this application provides an audio data processing method performed at a server system. The server system includes a cloud application program, a system framework, a forwarding program, and an audio capturing program. The method includes: inputting first audio data of the cloud application program to the system framework; processing the first audio data through the system framework to obtain second audio data, and transmitting the second audio data to the forwarding program; and transmitting the second audio data from the forwarding program to the audio capturing program according to a communication connection between the forwarding program and the audio capturing program, the audio capturing program being configured to transmit the second audio data to a local application program of a terminal.

According to another aspect, an embodiment of this application provides a delay obtaining method, applied to a server. The server includes a detection application program, a system framework, a forwarding program, and an audio capturing program. The method includes: inputting first detection audio data of the detection application program to the system framework, and recording a transmission moment of the first detection audio data; processing the first detection audio data through the system framework to obtain second detection audio data, and transmitting the second detection audio data to the forwarding program; and transmitting the second detection audio data to the audio capturing program through the forwarding program according to a communication connection between the forwarding program and the audio capturing program, and recording a first receiving moment at which the audio capturing program receives the second detection audio data, the audio capturing program being configured to transmit the second detection audio data to a local application program of a terminal; and obtaining a first time difference between the transmission moment and the first receiving moment, the first time difference representing a transmission delay of detection audio data from the detection application program to the audio capturing program.

According to another aspect, an embodiment of this application provides a server. The server includes an application running module, a framework running module, a forwarding module, and a capturing module. The application running module is configured to input first audio data of a cloud application program to the framework running module. The framework running module is configured to process the first audio data to obtain second audio data and transmit the second audio data to the forwarding module. The forwarding module is configured to transmit the second audio data to the capturing module according to a communication connection between the forwarding module and the capturing module. The capturing module is configured to transmit the second audio data to a local application program of a terminal.

According to one aspect, an embodiment of this application provides a server. The server includes an application running module, a framework running module, a forwarding module, a capturing module, a record module, and an obtaining module. The application running module is configured to input first detection audio data of a detection application program to the framework running module. The record module is configured to record a transmission moment of the first detection audio data. The framework running module is configured to process the first detection audio data to obtain second detection audio data and transmit the second detection audio data to the forwarding module. The forwarding module is configured to transmit the second detection audio data to the capturing module according to a communication connection between the forwarding module and the capturing module. The capturing module is configured to transmit the second detection audio data to a local application program of a terminal. The record module is further configured to record a first receiving moment at which the capturing module receives the second detection audio data. The obtaining module is configured to obtain a first time difference between the transmission moment and the first receiving moment, the first time difference representing a transmission delay of detection audio data from the application running module to the capturing module.

According to another aspect, an embodiment of this application provides a computer-readable storage medium. The computer-readable storage medium stores a computer program. The computer program is configured to perform the audio data processing method according to the foregoing aspect, or is configured to perform the delay obtaining method according to the foregoing aspect.

According to still another aspect, an embodiment of this application provides a computer program product or a computer program. The computer program product or the computer program includes computer program code, and the computer program code is stored in a computer-readable storage medium. A processor of a computer device reads the computer program code from the computer-readable storage medium, and executes the computer program code, to cause the computer device to perform the audio data processing method according to the foregoing aspect, or perform the delay obtaining method according to the foregoing aspect.

According to still another aspect, an embodiment of this application provides a server, including:

a processor, a communication interface, a memory, and a communication bus.

The processor, the communication interface, and the memory communicate with each other by using the communication bus. The communication interface is an interface of a communication module.

The memory is configured to store program code, and transmit the program code to the processor.

The processor is configured to invoke instructions of the program code in the memory to perform the audio data processing method according to the foregoing aspect, or perform the delay obtaining method according to the foregoing aspect.

DESCRIPTION OF EMBODIMENTS

To make objectives, technical solutions, and advantages of this application clearer, the following further describes implementations of this application in detail with reference to the accompanying drawings.

It is to be understood that the terms "first", "second", and the like used in this application may be used for describing various concepts in this specification. However, the concepts are not limited by the terms unless otherwise specified. The terms are merely used for distinguishing one concept from another concept. For example, first audio data may be referred to as second audio data and second audio data may be similarly referred to as first audio data without departing from the scope of this application.

Before the embodiments of this application are described in detail, related concepts are first described below.

1. Cloud application program: an application program running on a server. In some embodiments, the cloud application program is a game application program, an audio processing application program, or the like.

2. Container: a container is encapsulated with related details necessary to run an application program, such as an operating system. One server may run multiple containers, and a cloud application program and an operating system may run in each container. The operating system is any operating system, such as Android operating system or iPhone operation system (iOS).

3. Hardware abstraction layer (AudioHal): located between a system framework and a hardware driver and responsible for receiving audio data delivered by the system framework and outputting the audio data to hardware through the hardware driver.

4. System framework: a framework provided in an operating system. In some embodiments, the framework is an audio processing framework (AudioFlinger) in an operating system.

5. Resampling program (RemoteSubmix): a module in an operating system, configured to perform audio mixing processing on audio in an operating system and then send the processed audio to a remote end through a network.

6. Audio capturing program: a program configured to capture audio data from an operating system of a server. The program may send the captured audio data to an encoding module (WebrtcProxy), and the encoding module encodes the audio data and then delivers the encoded audio data to an application program of a terminal. In some embodiments, when a cloud application program is a cloud game program, the audio capturing program is a cloud game backend.

7. Audio record interface (AudioRecord): an interface for capturing audio data in an operating system. A source of the audio data is a microphone, RemoteSubmix, or the like.

8. Audio mixing thread (MixerThread): a thread responsible for audio mixing in a system framework.

9. Record thread (RecordThread): a thread responsible for recording in a system framework.

Figure 1:
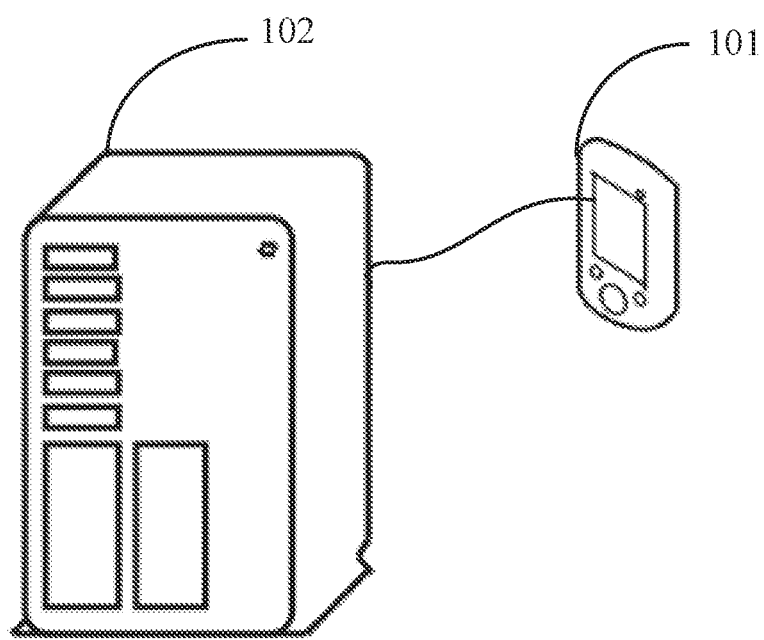
FIG. 1 is a schematic diagram of an implementation environment according to an embodiment of this application.

FIG. 1 is a schematic diagram of an implementation environment according to an embodiment of this application. Referring to FIG. 1, the implementation environment includes: a terminal 101 and a server 102. The terminal 101 and the server 102 may be directly or indirectly connected through wired or wireless communication. This is not limited herein in this application.

The terminal 101 may be a smartphone, a tablet computer, a notebook computer, a desktop computer, a smart speaker, a smartwatch, or the like, but is not limited thereto. In some embodiments, the server 102 may be an independent physical server. In some embodiments, the server 102 is a server cluster including multiple physical servers or a distributed system. In some embodiments, the server 102 for providing basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform.

A cloud application program runs on the server 102. When the cloud application program runs, the cloud application program generates audio data. The server 102 sends the audio data to the terminal 101, so that the terminal 101 can play, without running the application program, audio data generated by the application program.

In some embodiments, the terminal 101 is installed with a local application program. A user may send a control instruction to the server 102 through the local application program. A cloud application program in the server 102 runs according to the control instruction, and generates audio data corresponding to the control instruction. The server 102 delivers the audio data to the terminal 101, so that the user can play the audio data through the local application program of the terminal 101.

Figure 2:
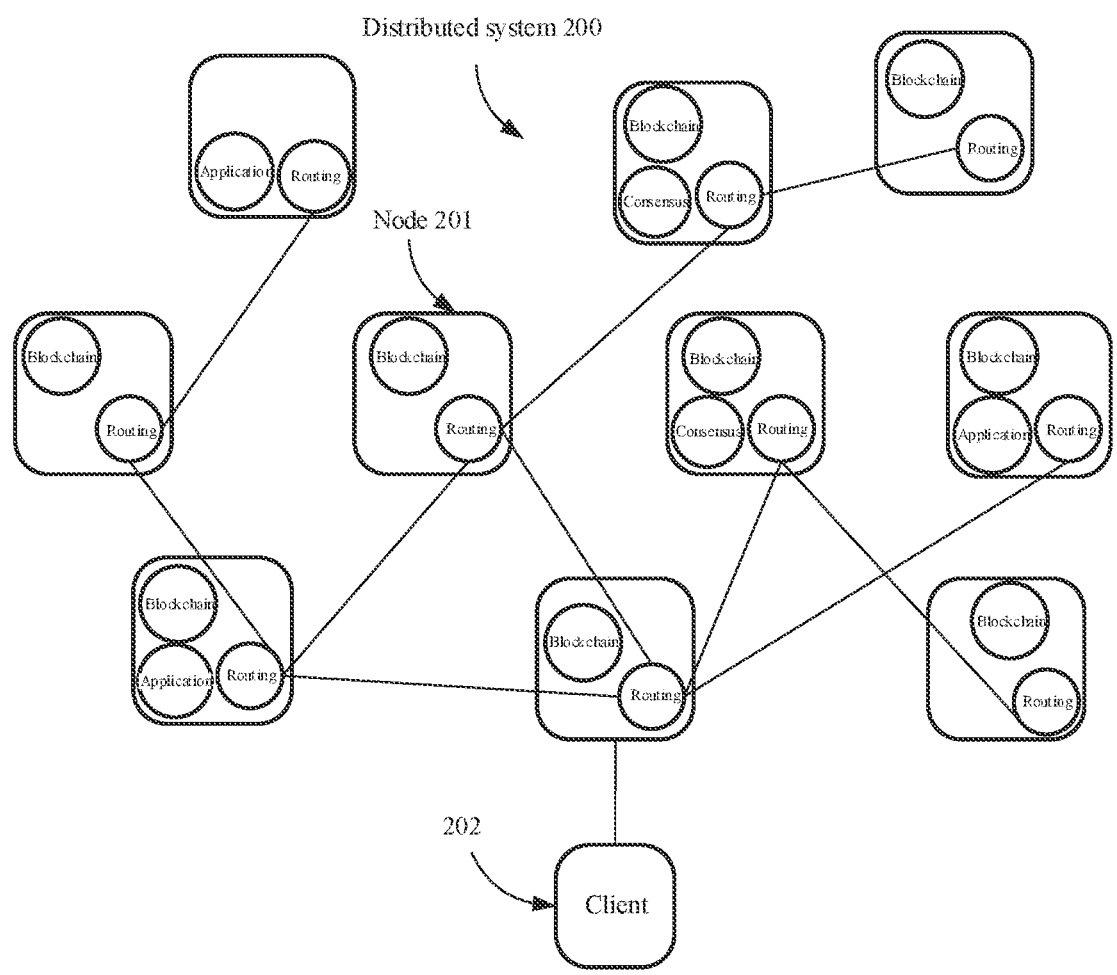
FIG. 2 is a schematic structural diagram of a distributed system applied to a block chain system according to an embodiment of this application.

In some embodiments, the terminal and the server in the embodiments of this application are connected to form a distributed system. For example, the distributed system is a blockchain system. Referring to FIG. 2, FIG. 2 is a schematic structural diagram of a distributed system 200 applied to a blockchain system according to an embodiment of this application. The distributed system is formed of a plurality of nodes 201 (computing devices in any form in an access network, such as, servers and terminals) and a client 202. A peer-to-peer (P2P) network is formed between the nodes. The P2P protocol is an application-layer protocol running over the Transmission Control Protocol (TCP). Any machine such as a server or a terminal may be added to the distributed system to become a node.

Referring to functions of each node in the blockchain system shown in FIG. 2, the related functions include the following:

(1) Routing: which is a basic function of a node, and is used for supporting communication between nodes.

In addition to the routing function, the node may further have the following functions:

(2) Application: which is deployed in a blockchain, and is used for implementing a particular service according to an actual service requirement, recording data related to function implementation to form recorded data, adding a digital signature to the recorded data to indicate a source of task data, and transmitting the recorded data to another node in the blockchain system, so that the another node adds the recorded data to a temporary block when successfully verifying a source and integrity of the recorded data.

For example, cloud application programs respectively run on multiple servers, each server is a node in a blockchain, and data obtained by running the cloud application programs on the multiple servers is synchronized.

The embodiments of this application may be applied to a cloud game scenario.

For example, a user controls running of a cloud game on a terminal. In an audio data processing method provided in the embodiments of this application, audio data generated when the cloud game runs is sent to a terminal, and the terminal plays the audio data, so that a user can listen to the audio data during the game.

In the audio data processing method provided in the embodiments of this application, the server can send the audio data to the terminal faster. This reduces a delay of the audio data and enables a user to listen to the audio data faster. Reducing the delay of the audio data is advantageous because the audio data will be more in-sync with the visual data. (e.g., video data, image data, etc.) of the application program (e.g., game application).

The embodiments of this application may also be applied to other scenarios in which a cloud application program runs on a server. An application scenario is not limited in the embodiments of this application.

Figure 3:
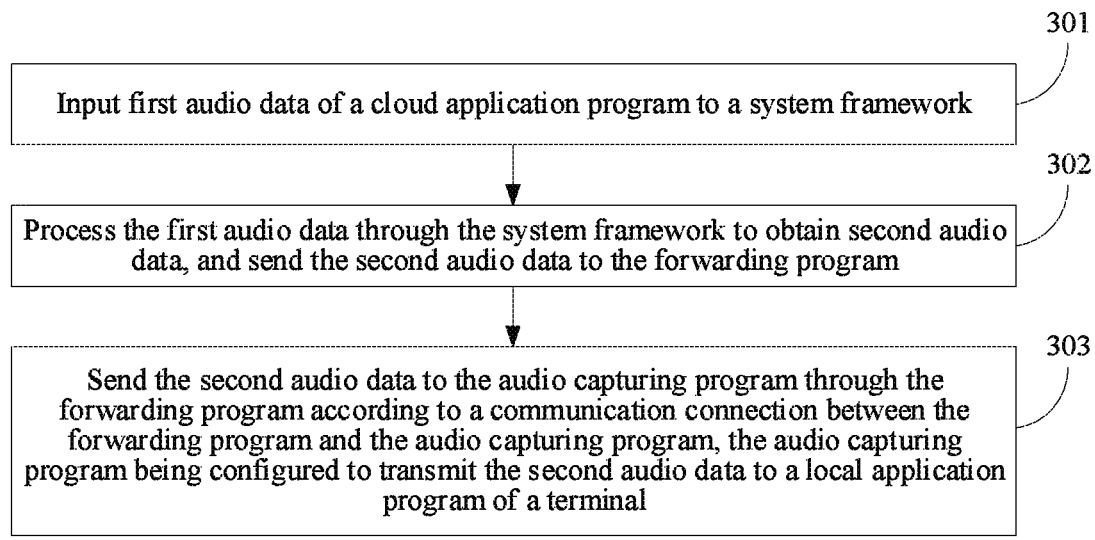
FIG. 3 is a flowchart of an audio data processing method according to an embodiment of this application.

FIG. 3 is a flowchart of an audio data processing method according to an embodiment of this application. This embodiment of this application is performed by a server. Referring to FIG. 3, the method includes the following steps.

301: Input first audio data of a cloud application program to a system framework.

The cloud application program is any application program running on a server. In some embodiments, the cloud application program is a game application program, an audio processing application program, or the like. A type of the cloud application program is not limited in this embodiment of this application. The first audio data is audio data generated when the cloud application program runs.

302: Process the first audio data through the system framework to obtain second audio data, and send the second audio data to a forwarding program.

The system framework is a framework in an operating system of a server and is configured to process audio data. The forwarding program is a program between the system framework and the audio capturing program and is configured to transmit audio data obtained after processing through the system framework to the audio capturing program. The forwarding program has a function of forwarding the audio data. In some embodiments, the forwarding program may also have other functions. This is not limited in this embodiment of this application.

303: Transmit the second audio data to the audio capturing program through the forwarding program according to a communication connection between the forwarding program and the audio capturing program, the audio capturing program being configured to transmit the second audio data to a local application program of a terminal.

The forwarding program and the audio capturing program have established a communication connection, and the forwarding program can directly send the second audio data to the audio capturing program through the communication connection.

The terminal is installed with the local application program, and the local application program is an application program that supports interaction between the terminal and the server. After receiving the second audio data, the audio capturing program sends the second audio data to the local application program of the terminal, so that the terminal plays the second audio data. The local application program is the local application program of the terminal in step 303.

In the audio data processing method provided in this embodiment of this application, the forwarding program is disposed between the system framework and the audio capturing program, and the forwarding program and the audio capturing program have established a communication connection. The audio data obtained after processing through the system framework can be directly sent to the audio capturing program through the communication connection. Compared with a solution in which the audio capturing program invokes an audio record interface to read audio data from a record thread, the foregoing method of directly sending the audio data through a communication connection reduces a transmission link of the audio data and shortens the time consumed to obtain the audio data by the audio capturing program and the delay in delivering the audio data by the server.

The forwarding program in steps 302 and 303 is a hardware abstraction layer; or an original resampling program in an operating system; or another program. This is not limited in this embodiment of this application.

Figure 4:
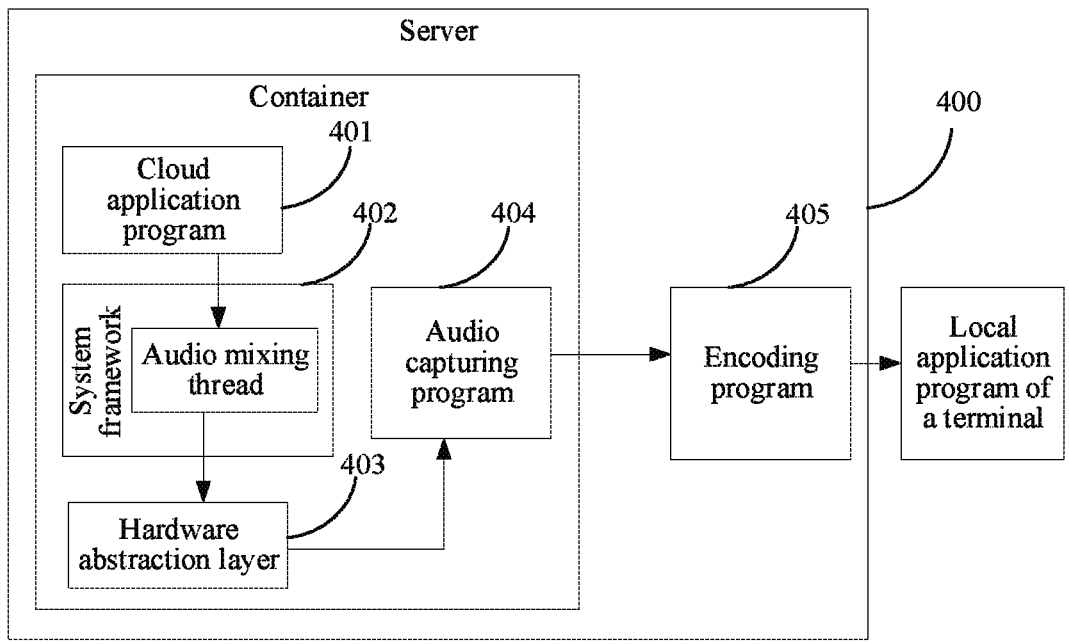
FIG. 4 is a flowchart of transmitting audio data when a server delivers the audio data to a terminal according to an embodiment of this application.

First, in an embodiment of this application, the forwarding program is, for example, a hardware abstraction layer, and the server is described. As shown in FIG. 4, the server 400 includes a cloud application program 401, a system framework 402, a hardware abstraction layer 403, and an audio capturing program 404.

The cloud application program 401 may invoke an interface of the system framework 402 to write audio data into the system framework 402 through, for example, an audio mixing thread. The system framework 402 may invoke an interface of the hardware abstraction layer 403 to write the audio data into the hardware abstraction layer 403. The hardware abstraction layer 403 and the audio capturing program 404 have established a communication connection, so that the audio data can be sent to the audio capturing program 404.

The cloud application program 401, the system framework 402, the hardware abstraction layer 403, and the audio capturing program 404 all run in an operating system container of the server 400.

In some embodiments, the server 400 also includes an encoding program 405. The audio capturing program 404 sends the audio data to the encoding program 405, and the encoding program 405 encodes the audio data and sends the encoded audio data to the local application program of the terminal.

Figure 5:
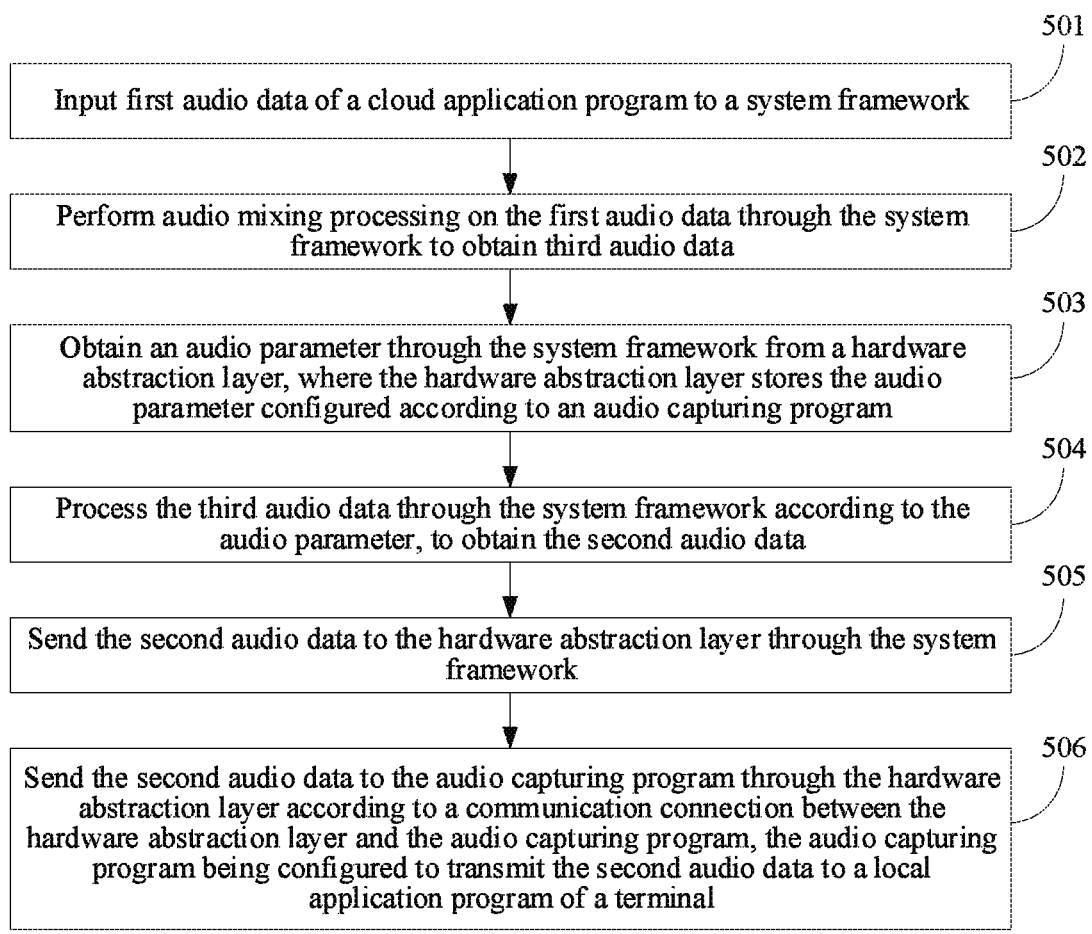
FIG. 5 is a flowchart of an audio data processing method according to an embodiment of this application.

Based on the server shown in FIG. 4, an embodiment of the present application further provides an audio data processing method. FIG. 5 is a flowchart of an audio data processing method according to an embodiment of this application. This embodiment of this application is performed by the server shown in FIG. 4. Referring to FIG. 5, the method includes the following steps.

501: Input first audio data of a cloud application program to a system framework.

The cloud application program is an application running on the server. A local application program is an application program installed on a terminal, and is an application program that supports interaction between the terminal and the server. The server may send data generated when the cloud application program runs to the local application program of the terminal, so that the terminal can display the data. Therefore, the terminal may obtain, without running the cloud application program, the data generated by the cloud application program.

In some embodiments, a user may also send an instruction to the server through the local application program of the terminal. The server runs the cloud application program according to the instruction, and sends data generated by the cloud application program to the local application program of the terminal, so that the terminal can control the operation of the cloud application program on the server. The terminal may also obtain data generated after the cloud application program runs. Therefore, the terminal may use the cloud application program without installing and running the cloud application program.

For example, a user triggers an operation of executing a skill a by a virtual character A in the local application program (e.g., a game application) of the terminal. The local application program of the terminal sends a skill execution instruction to the cloud application program in the server in response to the operation. The skill execution instruction carries a virtual identifier of the virtual character A and a skill identifier corresponding to the skill a. After receiving the skill execution instruction, the cloud application program renders, according to the skill execution instruction, video data of executing the skill a by the virtual character A, and sends the video data to the local application program of the terminal. The local application program of the terminal displays the video data, so that the user can watch pictures of executing the skill a by the virtual character A. As can be seen, in this embodiment of this application, the cloud application program in the server and the local application program of the terminal cooperate with each other, to perform the operation of executing the skill a by the virtual character A.

When the cloud application program runs, the cloud application program generates audio data. The server sends the audio data to the local application program of the terminal, so that the terminal can play or store the audio data.

For example, the cloud application program obtains first audio data according to the virtual identifier and the skill identifier in the skill execution instruction, and sends the first audio data to the local application program of the terminal. The first audio data is skill execution audio corresponding to execution of the skill a by the virtual character A. After receiving the first audio data, the local application program of the terminal plays the first audio data, so that the user can hear the corresponding skill execution audio when watching execution of the skill a by the virtual character A.

In some embodiments, the cloud application program stores various types of audio data, and the various types of audio data include the following types.

Background music: background music is audio data played when the cloud application program runs. In some embodiments, the cloud application program stores background music that implements loop playback as the cloud application program runs. In some embodiments, the cloud application program stores multiple pieces of background music, and the multiple pieces of background music implement loop playback as the cloud application program runs. Alternatively, different pieces of background music are suitable for different running stages, and the cloud application program selects background music corresponding to a running stage from multiple pieces of background music according to the running stage, to implement loop playback. In some embodiments, the cloud application program may further render video data during running, and select, according to the rendered video data, background music corresponding to the video data from multiple pieces of background music to implement loop playback.

Audio system notification: an audio system notification is an audio notification message sent to the terminal when the cloud application program runs. For example, when the cloud application program is a game application program, the audio system notification is "the enemy arrives within XX seconds", "our teammate XXX is besieged", or the like. After receiving the audio system notification, the terminal displays the audio system notification.

Operation audio: operation audio is audio data played during an operation, so that a user has an immersive experience. For example, if a user operates the virtual character A to execute a skill, audio of executing the skill is played, so that the user can clearly perceive the operation of executing the skill and have an immersive experience.

The background music, the audio system notification, and the operation audio are only examples of the various types of audio data and do not limit the various types of audio data.

When the cloud application program runs, the cloud application program may select audio data corresponding to a current running state from various types of audio data according to the current running state and send the audio data to the terminal. The first audio data is audio data corresponding to the current running state. The running state of the cloud application program includes: a startup state of the cloud application program, a state of executing an operation instruction by the cloud application program, a loading scene state of the cloud application program, and the like.

In some embodiments, in a startup process of the cloud application program, the cloud application program selects audio data corresponding to the startup state from various types of audio data. The audio data is the first audio data. The startup process of the cloud application program refers to that the cloud application program has been started, but the startup has not been completed. In this case, the cloud application program may perform some functions, such as obtaining audio data and delivering audio data. In some embodiments, the audio data corresponding to the startup state is audio data of the background music.

For example, the cloud application program is a game application program. For some large game application programs, the startup process takes some time. Therefore, in the startup process of the cloud application program, audio data is sent to the terminal, and the terminal plays the audio data, so that a user does not feel bored when waiting.

In some embodiments, in the running process of the cloud application program, the cloud application program receives an operation instruction sent by the local application program of the terminal, performs, in response to the operation instruction, an operation corresponding to the operation instruction, and selects audio data corresponding to the operation instruction from various types of audio data. The audio data is the first audio data.

For example, the cloud application program is a game application program. In the running process, the cloud application program receives a skill execution instruction sent by the terminal. The skill execution instruction carries a virtual character identifier and a skill identifier. The cloud application program controls a corresponding virtual character to execute a corresponding skill in response to the skill execution instruction according to the virtual character identifier and the skill identifier in the skill execution instruction, and selects audio data corresponding to execution of the skill from various types of audio data.

In some embodiments, the cloud application program includes one or more audio sources, and the multiple types of audio data are stored in the one or more audio sources. In some embodiments, each audio source stores one type of audio data and different audio sources store different types of audio data.

Correspondingly, the cloud application program may select the first audio data corresponding to a current running state from various types of audio data according to the current running state and send the first audio data to the terminal. This includes: the cloud application program reads, from any audio source, the first audio data corresponding to a current running state and sends the first audio data to the terminal; or the cloud application program determines a target audio source according to the current running state, reads the first audio data corresponding to the current running state from the target audio source, and sends the first audio data to the terminal.

Besides, when delivering the first audio data to the terminal, the cloud application program first inputs the first audio data to the system framework for processing.

502: Perform audio mixing processing on the first audio data through the system framework to obtain third audio data.

The system framework is a framework in an operating system, and the operating system is an Android system, iOS, or the like. In some embodiments, the system framework is an audio processing framework (AudioFlinger).

In some embodiments, the first audio data includes multiple channels of audio data. Performing audio mixing processing on the first audio data is mixing the multiple channels of audio data into one channel of audio data. Therefore, the third audio data obtained through audio mixing processing is one channel of audio data.

For example, the first audio data includes audio data corresponding to background music and audio data corresponding to operation audio, that is, the first audio data includes two channels of audio data. The audio data corresponding to the background music and the audio data corresponding to the operation audio are mixed into one channel of audio data to obtain the third audio data, so that the terminal plays the audio data more smoothly and the user subsequently hears the third audio data more smoothly to ensure the hearing effect of the user.

In addition, if the first audio data includes multiple channels of audio data, the user may pay more attention to a particular channel of audio data. For example, the first audio data includes audio data corresponding to background music and audio data corresponding to operation audio. The background music is audio data that is continuously played when the cloud application program runs, and the operation audio is audio data that is played when the user operates. Therefore, the user may pay more attention to the audio data corresponding to the operation audio. Therefore, the first audio data includes multiple channels of audio data, and the performing audio mixing processing on the first audio data to obtain third audio data includes: determining a weight of each channel of audio data in the first audio data, and mixing the multiple channels of audio data into one channel of audio data according to the weight of each channel of audio data, to obtain the third audio data.

In some embodiments, the weight of each channel of audio data is determined according to a type of the audio data. For example, a weight of a system notification is the largest, a weight of operation audio is intermediate, and a weight of background music is the smallest. Alternatively, a weight of operation audio is the largest, a weight of a system notification is intermediate, and a weight of background music is the smallest.

In some embodiments, if the system framework includes a processing thread, the performing audio mixing processing on the first audio data through the system framework to obtain the third audio data includes: performing audio mixing processing on the first audio data through the processing thread to obtain the third audio data. In some embodiments, the processing thread is an audio mixing thread.

503: Obtain an audio parameter through the system framework from a hardware abstraction layer, where the hardware abstraction layer stores the audio parameter.

In this embodiment of this application, the hardware abstraction layer is customized. The hardware abstraction layer is different from that on the terminal. The hardware abstraction layer on the terminal is configured to invoke an interface of hardware such as a speaker and input audio data to the hardware for playback. The hardware abstraction layer in this embodiment of this application is not connected to hardware, and instead establishes a communication connection with the audio capturing program and sends the audio data to the audio capturing program.

The audio capturing program is configured with an audio parameter. The audio parameter indicates that audio data to be received by the audio capturing program needs to satisfy the audio parameter. For example, if the audio parameter is 24 kilohertz (KHz) dual-channel, it indicates that the audio capturing program is configured to receive audio data of 24 KHz dual-channel.

If the audio parameter of the audio data sent by the hardware abstraction layer does not satisfy the requirement of the audio capturing program, the audio capturing program may not be able to receive the audio data smoothly. In some embodiments, the hardware abstraction layer stores the audio parameter, and the audio parameter is set according to the requirement of the audio capturing program. In this way, the system framework may obtain the audio parameter from the hardware abstraction layer and generate audio data that satisfies the audio parameter, so that the hardware abstraction layer can successfully send the audio data to the audio capturing program.

For example, the audio capturing program receives audio data of 24 KHz, and the audio parameter includes: a sampling rate 24 KHz.

In some embodiments, the audio parameter includes at least one of a target sampling rate, a target channel quantity, or a target sampling depth.

In addition, in some embodiments, step 503 is performed before step 502, or step 503 and step 502 are performed simultaneously, or step 503 is performed after step 502.

In some embodiments, in the running process of the cloud application program, step 503 is executed only once, or each time the system framework processes the audio data, step 503 needs to be performed. This is not limited in this embodiment of this application.

504: Process the third audio data through the system framework according to the audio parameter, to obtain the second audio data.

The third audio data may be processed according to the audio parameter of the hardware abstraction layer to obtain the second audio data, so that the audio parameter of the second audio data outputted by the system framework can meet the requirement of the audio capturing program. In this way, the audio parameter of the second audio data is consistent with the audio parameter of the hardware abstraction layer and satisfies the requirement of the audio capturing program. That is, processing the third audio data through the system framework according to the audio parameter, to obtain the second audio data is equivalent to adjusting the audio parameter of the audio data.

In some embodiments, the audio parameter includes at least one of a target sampling rate, a target channel quantity, or a target sampling depth. The processing the third audio data through the system framework according to the audio parameter, to obtain the second audio data includes at least one of the following (1) to (3).

(1) Perform resampling processing on the third audio data through the system framework according to a target sampling rate, to obtain the second audio data, where the audio parameter includes the target sampling rate.

For example, if the target sampling rate is 24 KHz and the sampling rate of the third audio data is 48 KHz, resampling processing is performed on the third audio data to obtain the second audio data with the sampling rate 24 KHz.

(2) Perform channel quantity modification processing on the third audio data through the system framework according to a target channel quantity, to obtain the second audio data, where the audio parameter includes the target channel quantity.

For example, if the target channel quantity is dual channels and the third audio data is single-channel audio data, channel quantity modification processing is performed on the third audio data to obtain dual-channel second audio data.

(3) Perform resampling processing on the third audio data through the system framework according to a target sampling depth, to obtain the second audio data, where the audio parameter includes the target sampling depth.

For example, if the target sampling depth is 8 bits and the sampling depth of the third audio data is 16 bits, resampling processing is performed on the third audio data to obtain the second audio data with the sampling depth 8 bits.

In some embodiments, the system framework includes a processing thread, and the processing the third audio data through the system framework according to the audio parameter, to obtain the second audio data includes: processing the third audio data through the processing thread according to the audio parameter, to obtain the second audio data. Audio mixing processing of the first audio data and processing of the third audio data according to the audio parameter in the system framework are all performed through the same thread, and do not need to be respectively performed through multiple threads. This reduces transmissions of the audio data in the processing process and accelerates processing of the audio data.

In some embodiments, the processing thread is an audio mixing thread.

505: Send the second audio data to the hardware abstraction layer through the system framework.

The second audio data is sent to the hardware abstraction layer through the system framework, and the hardware abstraction layer sends the second audio data to the audio capturing program. However, if the audio capturing program is not started or the hardware abstraction layer and the audio capturing program have not established a communication connection, even if the second audio data is sent to the hardware abstraction layer, the hardware abstraction layer cannot send the second audio data to the audio capturing program. Therefore, the second audio data is sent to the hardware abstraction layer through the system framework when the hardware abstraction layer and the audio capturing program have successfully established a communication connection.

In a possible implementation, the sending the second audio data to the hardware abstraction layer through the system framework includes: sending the second audio data to the hardware abstraction layer through the system framework when the hardware abstraction layer and the audio capturing program have established a communication connection; or controlling the hardware abstraction layer to establish a communication connection to the audio capturing program when the hardware abstraction layer and the audio capturing program have not established a communication connection, and sending the second audio data to the hardware abstraction layer through the system framework when the hardware abstraction layer and the audio capturing program have successfully established a communication connection.

The controlling the hardware abstraction layer to establish a communication connection to the audio capturing program includes: controlling the hardware abstraction layer to send a communication connection establishment request to the audio capturing program, and if the audio capturing program detects the communication connection establishment request through listening, establishing a communication connection between the hardware abstraction layer and the audio capturing program.

However, if the audio capturing program has not detected, through listening, the communication connection establishment request sent by the hardware abstraction layer, the hardware abstraction layer and the audio capturing program have not successfully established a communication connection, and the second audio data is discarded through the system framework and the second audio data is no longer sent to the hardware abstraction layer.

That the audio capturing program has not detected, through listening, the communication connection establishment request sent by the hardware abstraction layer may be because the audio capturing program is not successfully started. In a possible implementation, the audio capturing program is not only configured to send the audio data generated by the cloud application program to the local application program of the terminal, but also configured to send video data generated by the cloud application program to the local application program of the terminal. If the audio capturing program is not successfully started, the audio capturing program cannot send the video data generated by the cloud application program to the local application of the terminal. As a result, the terminal cannot render a picture of the cloud application program according to the video data. In this case, although the second audio data of the cloud application program is discarded, a user is not affected.

In some embodiments, the hardware abstraction layer includes a write interface, and the sending the second audio data to the hardware abstraction layer includes: invoking the write interface of the hardware abstraction layer through the system framework, to write the second audio data to the hardware abstraction layer.

For example, the system framework periodically invokes the write interface of the hardware abstraction layer, and determines, in the write interface, whether the hardware abstraction layer and the audio capturing program have established a communication connection. If the hardware abstraction layer and the audio capturing program have established a communication connection, the system framework writes the second audio data into the hardware abstraction layer, or if the hardware abstraction layer and the audio capturing program have not established a communication connection, controls the hardware abstraction layer to try to establish a communication connection to the audio capturing program. If the hardware abstraction layer and the audio capturing program have successfully established a communication connection, the second audio data is written into the hardware abstraction layer through the system framework, or if the hardware abstraction layer and the audio capturing program fail in establishing a communication connection, the second audio data is discarded.

506: Send the second audio data to the audio capturing program through the hardware abstraction layer according to a communication connection between the hardware abstraction layer and the audio capturing program, the audio capturing program being configured to transmit the second audio data to a local application program of a terminal.

The hardware abstraction layer and the audio capturing program have established a communication connection, and the communication connection may be any form of communication connection.

In some embodiments, the communication connection between the hardware abstraction layer and the audio capturing program is a socket connection.

Figure 6:
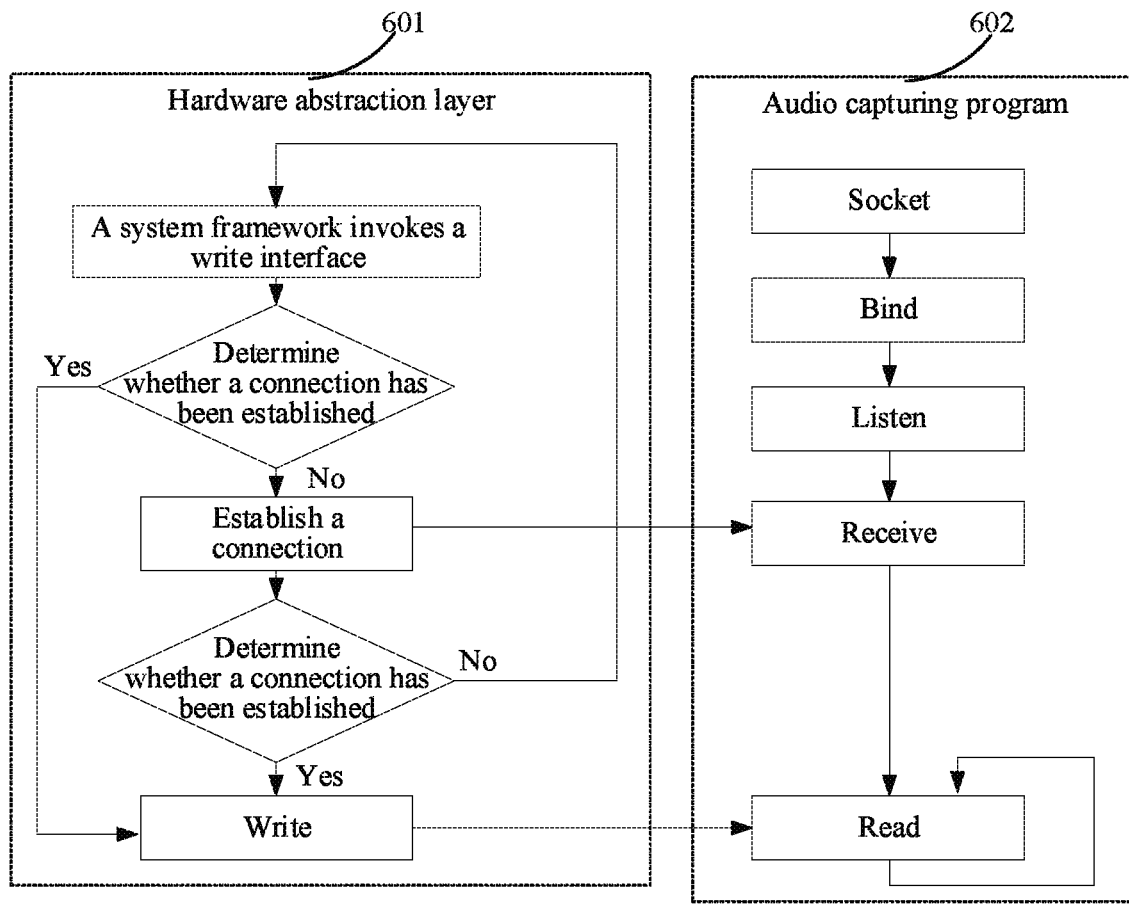
FIG. 6 is a flowchart of sending audio data to an audio capturing program by a hardware abstraction layer according to an embodiment of this application.

As shown in FIG. 6, the hardware abstraction layer 601 serves as a client of the socket, and the audio capturing program 602 serves as a serving end of the socket. The audio capturing program 602 includes a separate thread that is bound to the socket and listens in the thread. Invocation of an accept function of the socket is blocking invocation, and the audio capturing program 602 waits until the client of the socket is connected. After the hardware abstraction layer 601 and the audio capturing program 602 have established a socket connection, the audio capturing program 602 invokes a read function of the socket, where the read function is configured as a blocking function, and waits until the hardware abstraction layer 601 sends the audio data. Because both the hardware abstraction layer 601 and the audio capturing program 602 run in the same container, sending the second audio data to the audio capturing program 602 through the hardware abstraction layer 601 is equivalent to sending the second audio data locally, and a delay is measured by microsecond. This greatly reduces the transmission time of the second audio data and the delay in obtaining the audio data by the server.

In some embodiments, the communication connection between the hardware abstraction layer and the audio capturing program is a shared memory connection. A program A and a program B are used as an example. The shared memory connection means: the program A and the program B share a memory, the program A stores data in the memory, and the program B may read the data from the memory. This implements the connection between the program A and the program B and data transmission from the program A to the program B.

In a possible implementation, the sending the second audio data to the hardware abstraction layer through the system framework includes: sending the second audio data to a target memory of the hardware abstraction layer through the system framework, where the target memory is a shared memory of the hardware abstraction layer and the audio capturing program. Therefore, the sending the second audio data to the audio capturing program through the hardware abstraction layer according to a communication connection between the hardware abstraction layer and the audio capturing program includes: reading, by the audio capturing program, the second audio data from the target memory.

The hardware abstraction layer and the audio capturing program may establish any communication connection. The communication connection formed therebetween is not limited in this embodiment of this application. Besides, in this embodiment of this application, the socket connection and the shared memory connection are used as an example without limiting the communication connection formed therebetween.

In some embodiments, after obtaining the second audio data, the audio capturing program sends the second audio data to an encoding program, and the encoding program encodes the second audio data and then sends the encoded second audio data to the local application program of the terminal.

In some embodiments, the encoding program and the terminal may establish a communication connection. The encoding program sends the encoded second audio data to the local application program of the terminal according to the communication connection, and the local application program of the terminal decodes and plays the encoded second audio data. In some embodiments, the communication connection is a WebRTC peer-to-peer connection.

This embodiment of this application only uses an example in which the cloud application program outputs the lust audio data and the audio capturing program obtains the second audio data, to illustrate a process of processing and transmitting audio data between multiple programs of the server. In a possible implementation, in the running process of the cloud application program, the cloud application program may generate audio data all the time, or generate audio data for multiple times. Each process of transmitting audio data from the cloud application program to the audio capturing program is the same as that from step 501 to step 506. Details are not repeated in this embodiment of this application.

If the cloud application program continuously outputs audio data, the cloud application program periodically outputs audio data of a target size. In some embodiments, the target size of the audio data depends on a size of an audio data cache of the terminal. In some embodiments, the target size of the audio data depends on a size of a cache of the system framework, the hardware abstraction layer, or the audio capturing program. For example, the audio data is audio data with a playback duration of 10 milliseconds.

In the audio data processing method provided in this embodiment of this application, the forwarding program is disposed between the system framework and the audio capturing program, and the forwarding program and the audio capturing program have established a communication connection. The audio data obtained after processing through the system framework can be directly sent to the audio capturing program through the communication connection. Compared with a solution in which the audio capturing program invokes an audio record interface to read audio data from a record thread, the foregoing method of directly sending the audio data through a communication connection reduces a transmission link of the audio data and shortens the time consumed to obtain the audio data by the audio capturing program and the delay in delivering the audio data by the server.

In addition, the thread for audio mixing processing and the thread for processing according to the audio parameter in the system framework are both the processing thread, and one thread may perform processing twice. This reduces transmissions of the audio data, thereby shortening the time consumed to obtain the audio data by the hardware abstraction layer and the delay in delivering the audio data by the server.

In addition, if the hardware abstraction layer and the audio capturing program fail in establishing a communication connection, the hardware abstraction layer cannot send the second audio data to the audio capturing program. Therefore, when sending the second audio data to the hardware abstraction layer, the system framework determines whether the hardware abstraction layer and the audio capturing program have established a communication connection. For example, as shown in FIG. 6, if the hardware abstraction layer and the audio capturing program have not established a communication connection, the system framework controls the hardware abstraction layer to try to establish a communication connection to the audio capturing program. When it is determined (e.g., by the server 700) that the hardware abstraction layer and the audio capturing program have successfully established the communication connection, the second audio data is sent to the hardware abstraction layer through the system framework, and when the hardware abstraction layer and the audio capturing program fail in establishing a communication connection, the second audio data is discarded through the system framework. This reduces transmissions of useless data and load on the server.

Figure 7:
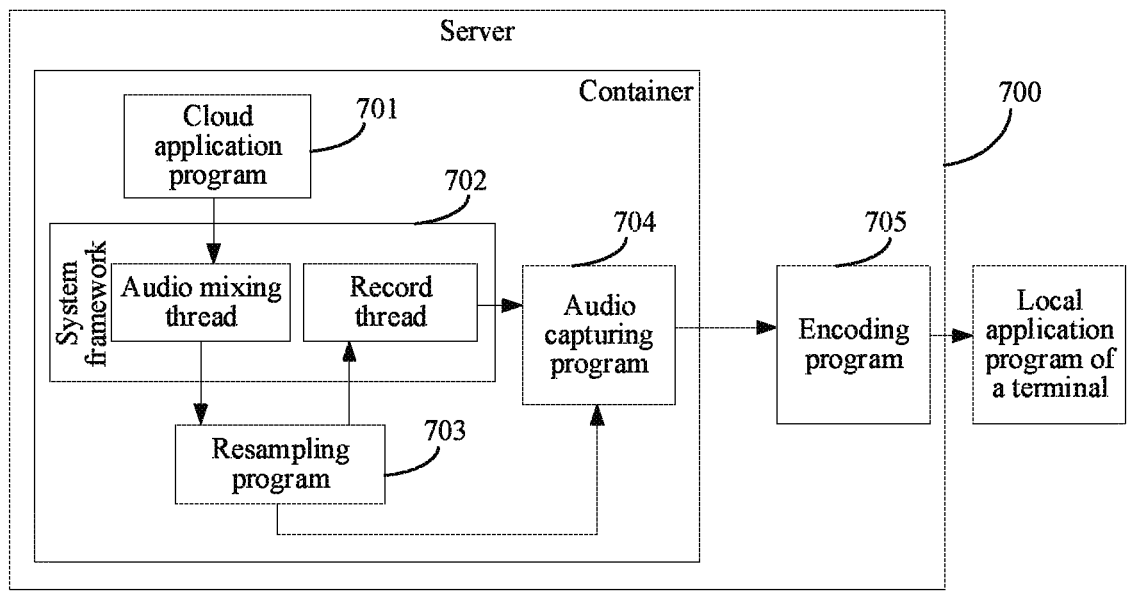
FIG. 7 is a flowchart of transmitting audio data when a server delivers the audio data to a terminal according to an embodiment of this application.

In a possible implementation, the forwarding program is a resampling program. As shown in FIG. 7, the server 700 includes a cloud application program 701, a system framework 702, a resampling program 703, and an audio capturing program 704.

The cloud application program 701 may invoke an interface of the system framework 702 to write audio data into the system framework 702, and the system framework 702 processes the audio data and then sends obtained audio data to the resampling program 703. The resampling program 703 and the audio capturing program 704 have established a communication connection, so that the audio data can be directly sent to the audio capturing program 704.

The cloud application program 701, the system framework 702, the resampling program 703, and the audio capturing program 704 all run in an operating system container of the server 700.

In some embodiments, the server 700 also includes an encoding program 705. The audio capturing program 704 sends the audio data to the encoding program 705, and the encoding program 705 encodes the audio data and sends the encoded audio data to the local application program of the terminal.

Figure 8:
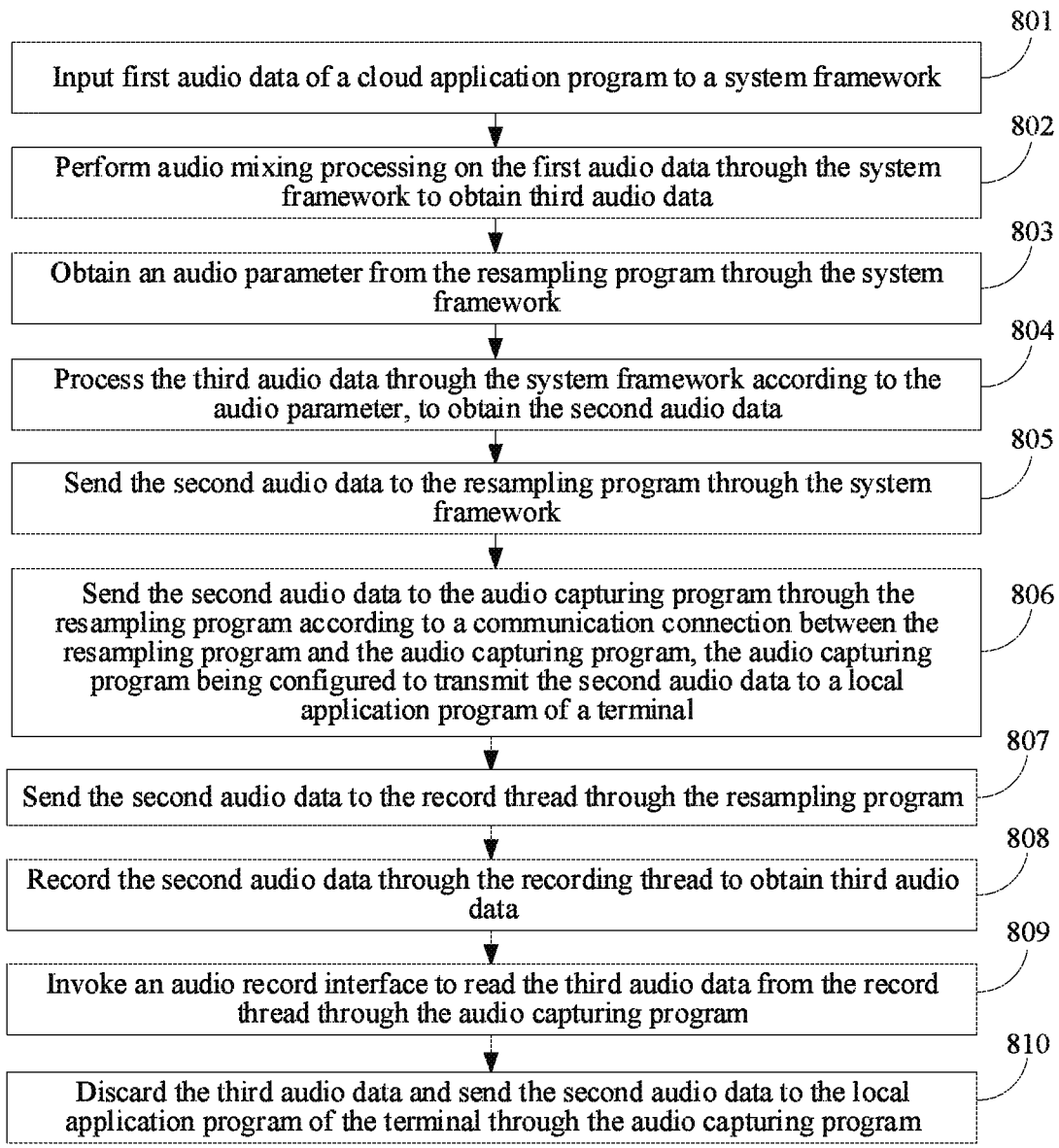
FIG. 8 is a flowchart of an audio data processing method according to an embodiment of this application.

Based on the server shown in FIG. 7, an embodiment of the present application further provides an audio data processing method. FIG. 8 is a flowchart of an audio data processing method according to an embodiment of this application. This embodiment of this application is performed by the server shown in FIG. 7. Referring to FIG. 8, the method includes the following steps.

801: Input first audio data of a cloud application program to a system framework.

Step 801 is similar to step 501 and is not repeated herein.

802: Perform audio mixing processing on the first audio data through the system framework to obtain third audio data.

Step 802 is similar to step 502 and is not repeated herein.

803: Obtain an audio parameter from the resampling program through the system framework.

The resampling program is configured with an audio parameter. The audio parameter indicates that audio data to be received by the resampling program needs to satisfy the audio parameter. For example, if the audio parameter is 48 KHz dual-channel, it indicates that the resampling program is configured to receive audio data of 48 KHz dual-channel. Therefore, the system framework obtains audio data from the resampling program to generate audio data that satisfies the requirement of the resampling program.

804: Process the third audio data through the system framework according to the audio parameter, to obtain the second audio data.

Step 804 is similar to step 504 and is not repeated herein.

805: Send the second audio data to the resampling program through the system framework.

The second audio data is sent to the resampling program through the system framework, and the resampling program sends the second audio data to the audio capturing program. However, if the audio capturing program is not started or the resampling program and the audio capturing program have not established a communication connection, even if the second audio data is sent to the resampling program, the resampling program cannot send the second audio data to the audio capturing program. In some embodiments, in accordance with a determination that the resampling program and the audio capturing program have successfully established a communication connection, the second audio data is sent to the resampling program through the system framework.

In a possible implementation, the sending the second audio data to the resampling program through the system framework includes: sending the second audio data to the resampling program through the system framework when (e.g., in accordance with a determination that) the resampling program and the audio capturing program have established a communication connection; or controlling the resampling program to establish a communication connection to the audio capturing program when (e.g., in accordance with a determination that) the resampling program and the audio capturing program have not established a communication connection, and sending the second audio data to the resampling program through the system framework when (e.g., in accordance with a determination that) the resampling program and the audio capturing program have successfully established a communication connection.

The controlling the resampling program to establish a communication connection to the audio capturing program includes: controlling the resampling program to send a communication connection establishment request to the audio capturing program, and if the audio capturing program detects the communication connection establishment request through listening, establishing a communication connection between the resampling program and the audio capturing program.

However, if the audio capturing program has not detected, through listening, the communication connection establishment request sent by the resampling program, the resampling program and the audio capturing program have not successfully established a communication connection, and the second audio data is discarded through the system framework and the second audio data is no longer sent to the resampling program.

That the audio capturing program has not detected, through listening, the communication connection establishment request sent by the resampling program may be because the audio capturing program is not successfully started. In a possible implementation, the audio capturing program is not only configured to send the audio data generated by the cloud application program to the local application program of the terminal, but also configured to send video data generated by the cloud application program to the local application program of the terminal. If the audio capturing program is not successfully started, the audio capturing program cannot send the video data generated by the cloud application program to the local application of the terminal. As a result, the terminal cannot render a picture of the cloud application program according to the video data. In this case, although the second audio data of the cloud application program is discarded, a user is not affected.

This embodiment of this application only uses an example in which the system framework sends the second audio data to the resampling program when (or after) the resampling program and the audio capturing program have successfully established a communication connection, to illustrate a transmission process of audio data in the server. In another embodiment, regardless of whether the resampling program and the audio capturing program have established a communication connection, the system framework sends the second audio data to the resampling program.

In some embodiments, in a possible implementation, the resampling program includes a receiving thread, and the sending the second audio data to the resampling program through the system framework includes: sending the second audio data to the receiving thread of the resampling program through the system framework.

In some embodiments, the system framework processes the first audio data through the processing thread, to obtain the second audio data. Therefore, in a possible implementation, the sending the second audio data to the receiving thread of the resampling program through the system framework includes: sending the second audio data to the receiving thread of the resampling program through the processing thread.

806: Send the second audio data to the audio capturing program through the resampling program according to a communication connection between the resampling program and the audio capturing program, the audio capturing program being configured to transmit the second audio data to a local application program of a terminal.

The resampling program and the audio capturing program have established a communication connection, and the communication connection is any form of communication connection.

In some embodiments, the communication connection between the resampling program and the audio capturing program is a socket connection. The resampling program serves as a client of the socket, and the audio capturing program serves as a serving end of the socket. A manner of sending the second audio data to the audio capturing program by the resampling program according to the socket connection between the resampling program and the audio capturing program is similar to that of sending the second audio data to the audio capturing program by the hardware abstraction layer according to the socket connection between the hardware abstraction layer and the audio capturing program in step 506. Details are not repeated herein.

In some embodiments, the communication connection between the resampling program and the audio capturing program is a shared memory connection. A manner of sending the second audio data to the audio capturing program by the resampling program according to the shared memory connection between the resampling program and the audio capturing program is similar to that of sending the second audio data to the audio capturing program by the hardware abstraction layer according to the shared memory connection between the hardware abstraction layer and the audio capturing program in step 506. Details are not repeated herein.

In some embodiments, the resampling program includes a receiving thread, and the communication connection between the resampling program and the audio capturing program is: a communication connection between the receiving thread and the audio capturing program; or the resampling program includes a receiving thread and a first sending thread, where the receiving thread is configured to receive the second audio data sent by the system framework, and the first sending thread is configured to send the second audio data received by the receiving thread to the audio capturing program. The communication connection between the resampling program and the audio capturing program is a communication connection between the first sending thread and the audio capturing program.

In addition, as can be seen from step 803, the audio parameter of the second audio data satisfies the requirement of the resampling program. If the audio parameter of the second audio data also satisfies the requirement of the audio capturing program, the resampling program can directly send the second audio data to the audio capturing program. If the audio parameter of the second audio data does not satisfy the requirement of the audio capturing program, the resampling program needs to perform resampling processing on the second audio data, so that the processed second audio data satisfies the requirement of the audio capturing program, and then sends the processed second audio data to the audio capturing program.

For example, the audio parameter configured for the resampling program is 48 KHz dual-channel. If the audio parameter of the audio capturing program is 48 KHz dual-channel, the resampling program does not need to perform resampling processing on the second audio data, and directly sends the second audio data to the audio capturing program. If the audio parameter of the audio capturing program is 16 KHz dual-channel, the resampling program needs to perform resampling processing on the second audio data, so that a sampling rate of the processed second audio data is 16 KHz.

The resampling program does not need to perform resampling processing when the audio parameter configured for the resampling program is the same as that configured for the audio capturing program. Therefore, the resampling program may be configured according to the audio parameter configured for the audio capturing program, so that the audio parameter configured for the resampling program is the same as that configured for the audio capturing program.

In a possible implementation, the system framework further includes a record thread and a detection thread. The detection thread in the system framework detects whether another program currently reads data from the record thread. If no other program reads data from the record thread, data is no longer sent to the resampling program through the system framework. The detection thread is designed to reduce unnecessary operations and power consumption.

In addition, if the system framework further includes the record thread, the server further needs to perform the following step 807 to step 810. If the system framework does not include the record thread, after obtaining the second audio data, the audio capturing program sends the second audio data to the local application program of the terminal.

807: Transmit the second audio data to the record thread through the resampling program.

The second audio data is sent to the record thread through the resampling program, and the record thread records the received second audio data. The record thread records the second audio data while receiving the second audio data, and a record process consumes time. As a result, the resampling program also consumes time to send the second audio data to the record thread. In some embodiments, the resampling program includes a receiving thread and a second sending thread. The receiving thread is configured to receive the second audio data from the system framework, and when the second sending thread has an available cache, send the second audio data to the second sending thread. After receiving the second audio data, the second sending thread determines, according to the audio parameter configured for the record thread, whether to perform resampling processing on the second audio data. If resampling processing needs to be performed on the second audio data, the second sending thread performs resampling processing on the second audio data according to the audio parameter configured for the record thread, to obtain the processed second audio data, and sends the processed second audio data to the record thread. If resampling processing does not need to be performed on the second audio data, the second sending thread directly sends the second audio data to the record thread.

That the second sending thread has an available cache means that: the second sending thread sends all audio data previously received by the resampling program to the record thread.

In addition, if the audio parameter of the second audio data is the same as that configured for the record thread, the resampling program directly sends the second audio data to the record thread, and the record thread may record the second audio data. If the audio parameter of the second audio data is different from that configured for the record thread and the resampling program directly sends the second audio data to the record thread, the record thread may not be able to sequentially receive the second audio data. The determining, by the second sending thread according to the audio parameter configured for the record thread, whether to perform resampling processing on the second audio data includes: determining, by the second sending thread, whether the audio parameter of the second audio data is the same as that configured for the record thread, and if the audio parameter of the second audio data is the same as that configured for the record thread, determining that resampling processing does not need to be performed on the second audio data; or if the audio parameter of the second audio data is different from that configured for the record thread, determining that resampling processing needs to be performed on the second audio data.

808: Record the second audio data through the record thread to obtain third audio data.

The system framework further includes a cache corresponding to the record thread. The recording the second audio data through the record thread to obtain third audio data includes: copying the second audio data to the corresponding cache through the record thread, to obtain the third audio data. Content of the third audio data is the same as that of the second audio data.

809: Invoke an audio record interface to read the third audio data from the record thread through the audio capturing program.

The record thread copies the third audio data to the corresponding cache. The invoking an audio record interface to read the third audio data from the record thread through the audio capturing program includes: invoking the audio record interface to read the third audio data from the cache corresponding to the record thread through the audio capturing program.

In some embodiments, the audio record interface includes a read function. The invoking an audio record interface to read the third audio data from the record thread through the audio capturing program includes: invoking the read function of the audio record interface to read the third audio data from the cache corresponding to the record thread through the audio capturing program; and if the cache corresponding to the record thread does not include the third audio data, waiting, by the audio capturing program, until the record thread copies the third audio data to the cache, and then reading the third audio data.

810: Discard the third audio data and transmit the second audio data to the local application program of the terminal through the audio capturing program.

Content of the second audio data is the same as that of the third audio data, but the second audio data is directly sent to the audio capturing program by the resampling program and the third audio data is sent to the record thread by the resampling program and is then read from the record thread by the audio capturing program. Therefore, the second audio data can reach the audio capturing program faster than the third audio data. To reduce a delay in sending audio data by the server, the second audio data is sent to the local application program of the terminal and the third audio data is discarded through the audio capturing program.

In addition, the audio capturing program and the resampling program have established a communication connection and the second audio data is obtained according to the communication connection, but the third audio data is obtained by invoking the audio record interface through the audio capturing program. Therefore, methods of obtaining the second audio data and the third audio data are different. In some embodiments, the second audio data and the third audio data are distinguished from each other according to obtaining methods. The second audio data is sent to the local application program of the terminal.

For example, the audio capturing program includes a first capturing thread and a second capturing thread. The first capturing thread is configured to capture the second audio data. The first capturing thread and the resampling program have established a communication connection. The resampling program sends the second audio data to the first capturing thread according to the communication connection between the resampling program and the first capturing thread. The second capturing thread is configured to capture the third audio data and invoke the audio record interface to read the third audio data from the record thread. The server sends the audio data captured by the first capturing thread to the local application program of the terminal, and discards the audio data captured by the second capturing thread.

The resampling program in this embodiment of this application is a program in an operating system, that is, the resampling program is a program that the operating system is equipped with. In this application, the original program in the operating system is improved to implement the above audio data processing method.

This embodiment of this application only uses an example in which the cloud application program outputs the first audio data and the audio capturing program obtains the second audio data, to illustrate a process of processing and transmitting audio data between multiple programs of the server. In a possible implementation, in the running process of the cloud application program, the cloud application program may generate audio data all the time, or generate audio data for multiple times. Each process of transmitting audio data from the cloud application program to the audio capturing program is the same as that from step 801 to step 810. Details are not repeated in this embodiment of this application.

If the cloud application program continuously outputs audio data, the cloud application program periodically outputs audio data of a target size. In some embodiments, the target size of the audio data depends on a size of an audio data cache of the terminal. In some embodiments, the target size of the audio data depends on a size of a cache of the system framework, the resampling program, or the audio capturing program. For example, the audio data is audio data with a playback duration of 10 ms.

In the audio data processing method provided in this embodiment of this application, the resampling program in the operating system is improved. The resampling program and the audio capturing program have established a communication connection, so that the resampling program can directly send the second audio data to the audio capturing program through the communication connection. Compared with a solution in which the audio capturing program invokes an audio record interface to read audio data from a record thread, the foregoing method of directly sending the audio data through a communication connection reduces a transmission link of the audio data and shortens the time consumed to obtain the audio data by the audio capturing program and the delay in delivering the audio data by the server.

In addition, the resampling program further sends the audio data to the record thread, and the audio capturing program reads the audio data from the record thread, to ensure that the system framework continuously sends audio data to the resampling program and ensure continuous processing and sending of audio data. In addition, the audio capturing program sends the audio data sent by the resampling program and discards the audio data read from the record thread, to ensure a short delay in delivering the audio data.

Figure 9:
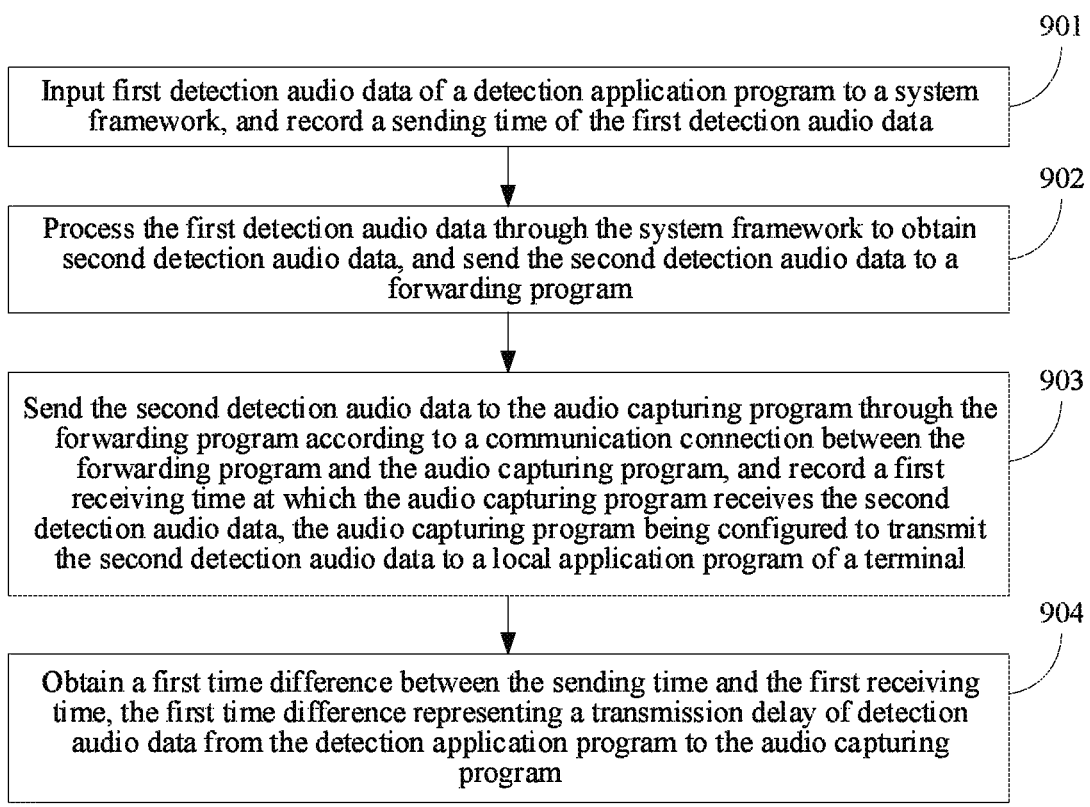
FIG. 9 is a flowchart of a delay obtaining method according to an embodiment of this application.

In addition, an embodiment of this application further provides a delay obtaining method. The delay obtaining method is used to obtain a delay in obtaining audio data by a server in the above audio data processing method. FIG. 9 is a flowchart of a delay obtaining method according to an embodiment of this application. This embodiment of this application is performed by a server. Referring to FIG. 9, the method includes the following steps.

901: Input first detection audio data of a detection application program to a system framework, and record a transmission moment of the first detection audio data.

The detection application program is an application program running in a server and configured to detect a delay in delivering audio data by the server. The detection application program may output detection audio data, and a moment at which another program in the server receives the detection audio data is subsequently obtained, to obtain a time consumed to transmit the detection audio data to another program. The another program in the server is a program other than the detection application program.

The first detection audio data is any detection audio data outputted by the detection application program. In some embodiments, the detection application program may continuously output audio data, and in addition to outputting the detection audio data, also output other audio data. The detection audio data is different from other audio data, to distinguish the detection audio data from other audio data to obtain a moment at which a program receives the detection audio data.

902: Process the first detection audio data through the system framework to obtain second detection audio data, and send the second detection audio data to a forwarding program.

The system framework is a framework in an operating system and is configured to process audio data. The forwarding program is a program between the system framework and the audio capturing program and is configured to transmit audio data obtained after processing through the system framework to the audio capturing program. The forwarding program has a function of forwarding the audio data. In some embodiments, the forwarding program also has other functions. This is not limited in this embodiment of this application.

The second detection audio data is audio data obtained after the first detection audio data is processed through the system framework, but the second detection audio data and the first detection audio data are both audio data that can be distinguished from other audio data. Therefore, even if the first detection audio data is processed to obtain the second detection audio data, the second detection audio data can be distinguished from other audio data to obtain a moment at which the program receives the second detection audio data.

903: Transmit the second detection audio data to the audio capturing program through the forwarding program according to a communication connection between the forwarding program and the audio capturing program, and record a first receiving moment at which the audio capturing program receives the second detection audio data, the audio capturing program being configured to transmit the second detection audio data to a local application program of a terminal.

The audio capturing program is a program configured to capture audio data in the server and send the audio data to a terminal. The forwarding program and the audio capturing program have established a communication connection, and the forwarding program directly sends the second audio data to the audio capturing program through the communication connection.

904: Obtain a first time difference between the transmission moment and the first receiving moment, the first time difference representing a transmission delay of detection audio data from the detection application program to the audio capturing program.

The transmission moment is a moment at which the detection application program outputs the detection audio data, and the first receiving moment is a moment at which the audio capturing program receives the detection audio data. In addition, the audio capturing program is a program configured to capture audio data in the server and send the audio data to the terminal. Therefore, the moment at which the audio capturing program receives the detection audio data may be considered as a moment at which the server obtains the audio data. Therefore, the first time difference between the transmission moment and the first receiving moment also indicates a time consumed to obtain the audio data by the server, that is, a delay in delivering the audio data by the server.

In the delay obtaining method provided in this embodiment of this application, the detection application program sends the detection audio data, and the receiving moment at which the audio capturing program receives the detection audio data is obtained. A time consumed to transmit the audio data from the detection application program to the audio capturing program can be accurately obtained according to the time difference between the transmission moment and the receiving moment, that is, a time consumed to obtain the audio data by the server. The time may indicate a delay in delivering the audio data by the server. Subsequently, it may be determined, according to the time, whether the delay in obtaining the audio data by the server affects a playback effect of the audio data and affects a hearing effect of a user of the terminal, to determine whether to continue to improve the server. This provides desirable reference of improvement for developers.

The forwarding program in steps 902 and 903 is a hardware abstraction layer; or an original resampling program in an operating system; or another program. This is not limited in this embodiment of this application.

Figure 10:
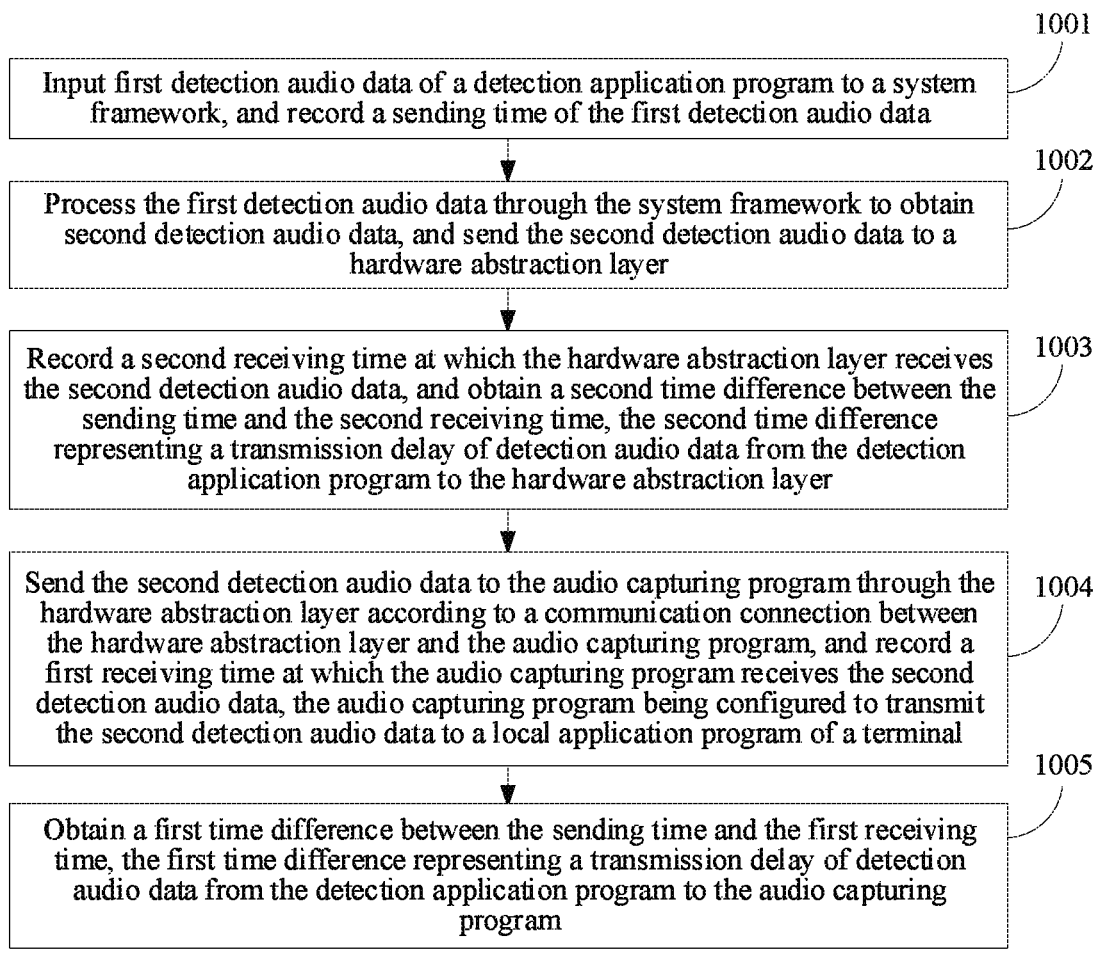
FIG. 10 is a flowchart of a delay obtaining method according to an embodiment of this application.

In some embodiments, the forwarding program is a hardware abstraction layer. As shown in FIG. 4, the server 400 includes a cloud application program 401, a system framework 402, a hardware abstraction layer 403, and an audio capturing program 404. Based on the server shown in FIG. 4, an embodiment of this application further provides a delay obtaining method, to detect a delay in delivering audio data by the server shown in FIG. 4. FIG. 10 is a flowchart of a delay obtaining method according to an embodiment of this application. This embodiment of this application is performed by the server shown in FIG. 4. Referring to FIG. 10, the method includes the following steps.

1001: Input first detection audio data of a detection application program to a system framework, and record a transmission moment of the first detection audio data.

The detection application program is an application program running in a server and configured to detect a delay in delivering audio data by the server. The detection application program may output detection data, and a moment at which another program in the server receives the detection data is subsequently obtained, to obtain a time consumed to transmit the detection data to another program. The another program in the server is a program other than the detection application program.

To more accurately obtain a time consumed to transmit the audio data between multiple programs in the server, the detection data outputted by the detection application program is detection audio data. Because the detection audio data is audio data, after the detection audio data is outputted to another program such as the system framework, the another program may simulate a real audio data processing process. Therefore, it is more accurate to subsequently determine a delay by obtaining a moment at which the another program receives the detection audio data.

In some embodiments, the detection application program is different from the cloud application program in step 501. The cloud application program outputs audio data according to a received operation instruction, but the detection application program outputs audio data according to configured detection logic. In some embodiments, the configured detection logic is sending detection audio data at an interval of a first time period. The first time period may be any time period such as 4 seconds or 5 seconds.

The first detection audio data is any detection audio data outputted by the detection application program. In some embodiments, the detection application program may continuously output audio data, and in addition to outputting the detection audio data, also output other audio data. The detection audio data is different from other audio data, to distinguish the detection audio data from other audio data to obtain a moment at which a program receives the detection audio data.

In some embodiments, the first detection audio data is audio data carrying a tag, and it may be subsequently determined, according to the tag carried by the first detection audio data, whether the first detection audio data is received.

Figure 11:
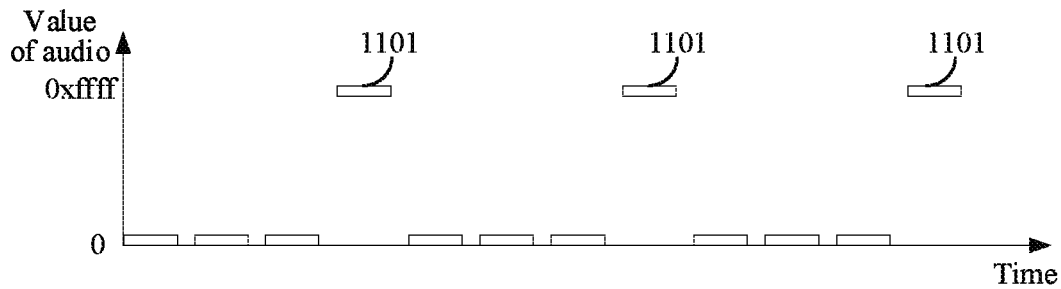
FIG. 11 is a schematic diagram of multiple pieces of audio data outputted by a detection application program according to an embodiment of this application.

In some embodiments, the first detection audio data is audio data with a fixed value, and the first detection audio data is different from other audio data outputted by the detection application program. For example, the value of the first detection audio data is 0xffff (0x represents hexadecimal and ffff represents a hexadecimal value), and a value of other audio data outputted by the detection application program is 0. As shown in FIG. 11, the detection application program outputs audio data whose value is 0, and periodically outputs detection audio data 1101 whose value is 0xffff.

In some embodiments, the server further includes a record program. The record program records a current moment at which the detection application program inputs the first detection audio data to the system framework. The current moment is a transmission moment of the first detection audio data. In some embodiments, when inputting the first detection audio data to the system framework, the detection application program sends a message to the record program. The message indicates that the detection application program inputs the first detection audio data to the system framework. The record program records a moment at which the message is received as the transmission moment of the first detection audio data.

The record program is a program other than the detection application program, or a program with a record function in the detection application program.

In some embodiments, the record program further has a function of monitoring another program. The record program may detect data in the system framework, and when detecting that the system framework includes the detection audio data, record a current moment. The current moment is the transmission moment of the first detection audio data.

1002: Process the first detection audio data through the system framework to obtain second detection audio data, and send the second detection audio data to a hardware abstraction layer.

A manner of processing the first detection audio data through the system framework is similar to that of processing the first audio data through the system framework in step 502, and a manner of sending the second detection audio data to the hardware abstraction layer through the system framework is similar to that of sending the second audio data to the hardware abstraction layer through the system framework in step 505. Details are not repeated herein.

The second detection audio data obtained after the first detection audio data is processed through the system framework is similar to the first detection audio data. Both the second detection audio data and the first detection audio data can be distinguished from other audio data.

For example, if the first detection audio data is audio data carrying a tag, the second detection audio data also carries the tag. If a value of the first detection audio data is 0xffff and a value of other audio data is 0, a value of the second detection audio data is a non-zero value. The value of other audio data is still 0 after processing. That is, processing of the detection audio data does not invalidate a detection function of the detection audio data.

1003: Record a second receiving moment at which the hardware abstraction layer receives the second detection audio data, and obtain a second time difference between the transmission moment and the second receiving moment, the second time difference representing a transmission delay of detection audio data from the detection application program to the hardware abstraction layer.

The record program is further configured to: record the second receiving moment at which the hardware abstraction layer receives the second detection audio data, and before recording the second receiving moment, first determine that the hardware abstraction layer receives the second detection audio data. In some embodiments, after receiving the second detection audio data, the hardware abstraction layer reports a message to the record program to inform the record program that the second detection audio data has been received. When receiving the reported message, the record program records a current moment. The current moment is the second receiving moment at which the hardware abstraction layer receives the second detection audio data.

In some embodiments, the record program further has a function of monitoring another program. For example, the record program detects whether code of the hardware abstraction layer includes the second detection audio data, and records the current moment when the second detection audio data is detected. The current moment is the second receiving moment at which the hardware abstraction layer receives the second detection audio data.

1004: Transmit the second detection audio data to the audio capturing program through the hardware abstraction layer according to a communication connection between the hardware abstraction layer and the audio capturing program, and record a first receiving moment at which the audio capturing program receives the second detection audio data, the audio capturing program being configured to transmit the second detection audio data to a local application program of a terminal.

Sending the second detection audio data to the audio capturing program by the hardware abstraction layer according to the communication connection between the hardware abstraction layer and the audio capturing program is similar to sending the second audio data to the audio capturing program by the hardware abstraction layer according to the communication connection between the hardware abstraction layer and the audio capturing program in step 506. Details are not repeated herein.

The record program is further configured to: record the first receiving moment at which the audio capturing program receives the second detection audio data, and before recording the first receiving moment, first determine that the audio capturing program receives the second detection audio data. In some embodiments, after receiving the second detection audio data, the audio capturing program reports a message to the record program to inform the record program that the second detection audio data has been received. When receiving the reported message, the record program records a current moment. The current moment is the first receiving moment at which the audio capturing program receives the second detection audio data.

In some embodiments, the record program further has a function of monitoring another program. For example, the record program detects whether code of the audio capturing program includes the second detection audio data, and records the current moment when the second detection audio data is detected. The current moment is the first receiving moment at which the audio capturing program receives the second detection audio data.

1005: Obtain a first time difference between the transmission moment and the first receiving moment, the first time difference representing a transmission delay of detection audio data from the detection application program to the audio capturing program.

This embodiment of this application only uses an example in which the detection application program outputs the first detection audio data to obtain a time consumed to transmit the first detection audio data between multiple programs in the server, to illustrate obtaining of the delay in delivering the audio data by the server. In a possible implementation, when the detection application program runs, the detection application program may output audio data all the time (e.g., continuously) and output detection audio data at regular intervals, and the delay in delivering audio data by the server may be obtained according to each piece of detection audio data. In some embodiments, statistical collection processing is performed on multiple delays to obtain a target delay in delivering the audio data by the server. Because transmission processes of multiple pieces of detection audio data are considered for the target delay, the target delay is more accurate. In some embodiments, the statistical collection processing is averaging processing.

For example, the detection application program sends the detection audio data at regular intervals, and multiple first time differences and multiple second time differences may be subsequently obtained. A time difference obtained by performing statistical collection processing on the multiple first time differences can more accurately indicate a delay in transmitting the detection audio data from the detection application program to the audio capturing program. A time difference obtained by performing statistical collection processing on the multiple second time differences can more accurately indicate a delay in transmitting the detection audio data from the detection application program to the hardware abstraction layer.

To ensure that two adjacent pieces of detection audio data can be clearly distinguished from each other, a large time interval such as 4 seconds or 5 seconds may be set.

Figure 12:
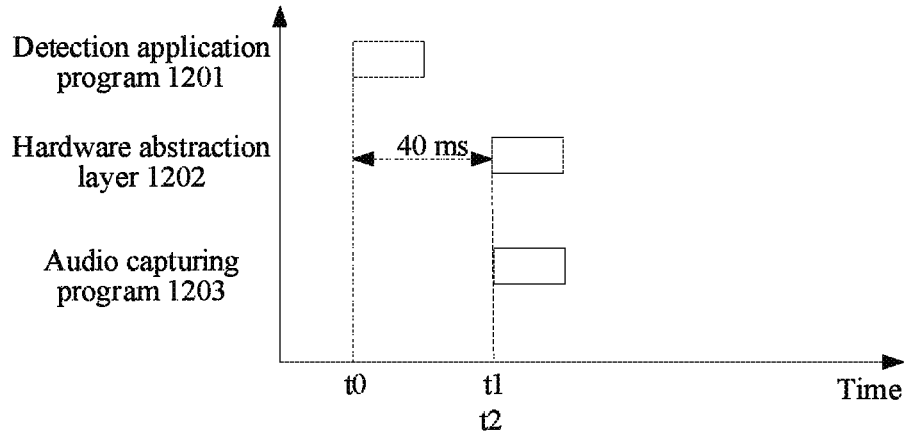
FIG. 12 is a schematic diagram of delays of obtaining audio data by multiple programs in a server according to an embodiment of this application.

As shown in FIG. 12, in a process of actually obtaining a delay, the transmission moment at which a detection application program 1201 sends the first detection audio data is t0, and the second receiving moment at which a hardware abstraction layer 1202 receives the second detection audio data is t1. According to t0 and t1, it can be learned that the delay of the detection audio data from the detection application program 1201 to the hardware abstraction layer 1202 is about 40 ms (milliseconds). A moment at which the audio capturing program 1203 receives the second detection audio data is t2. According to t1 and t2, it can be learned that the delay of the second detection audio data from the hardware abstraction layer 1202 to the audio capturing program 1203 is about 0 ms. Therefore, a time consumed to obtain the audio data from the operating system by the server is controlled to be about 40 ms. This greatly shortens the time consumed to obtain the audio data by the server.

In a possible implementation, the server not only sends audio data generated by the cloud application program to the terminal, but also sends video data generated by the cloud application program to the terminal. A delay between the audio and the video played by the terminal is detected, and it is found that the audio and the video are not synchronized and a delay from playing the video to playing the audio corresponding to the video is about 0.37 seconds. When a delay between a video and audio is higher than 0.3 seconds, the human ear can perceive an obvious delay, affecting user experience. If the audio data processing method provided in this embodiment of this application is used, a delay in delivering audio data by the server can be reduced and a delay between a video and audio can be reduced to about 0.242 seconds, so that the human ear cannot perceive an obvious delay, improving user experience.

In the delay obtaining method provided in this embodiment of this application, the detection application program sends the detection audio data, and the receiving moment at which the audio capturing program receives the detection audio data is obtained. A time consumed to transmit the audio data from the detection application program to the audio capturing program can be accurately obtained according to the time difference between the transmission moment and the receiving moment, that is, a time consumed to obtain the audio data by the server. The time may indicate a delay in delivering the audio data by the server. Subsequently, it may be determined, according to the time, whether the delay in obtaining the audio data by the server affects a playback effect of the audio data and affects a hearing effect of a user of the terminal, to determine whether to continue to improve the server. This provides desirable reference of improvement for developers.

In addition, the receiving moment at which the hardware abstraction layer receives the detection audio data may be further obtained, to further obtain the time consumed to transmit the detection audio data from the detection application program to the hardware abstraction layer, and the time consumed to transmit the detection audio data from the hardware abstraction layer to the audio capturing program. In this way, the time consumed in each transmission stage of the audio data can be accurately obtained, so that subsequently developers can improve the server in a targeted manner.

Figure 13:
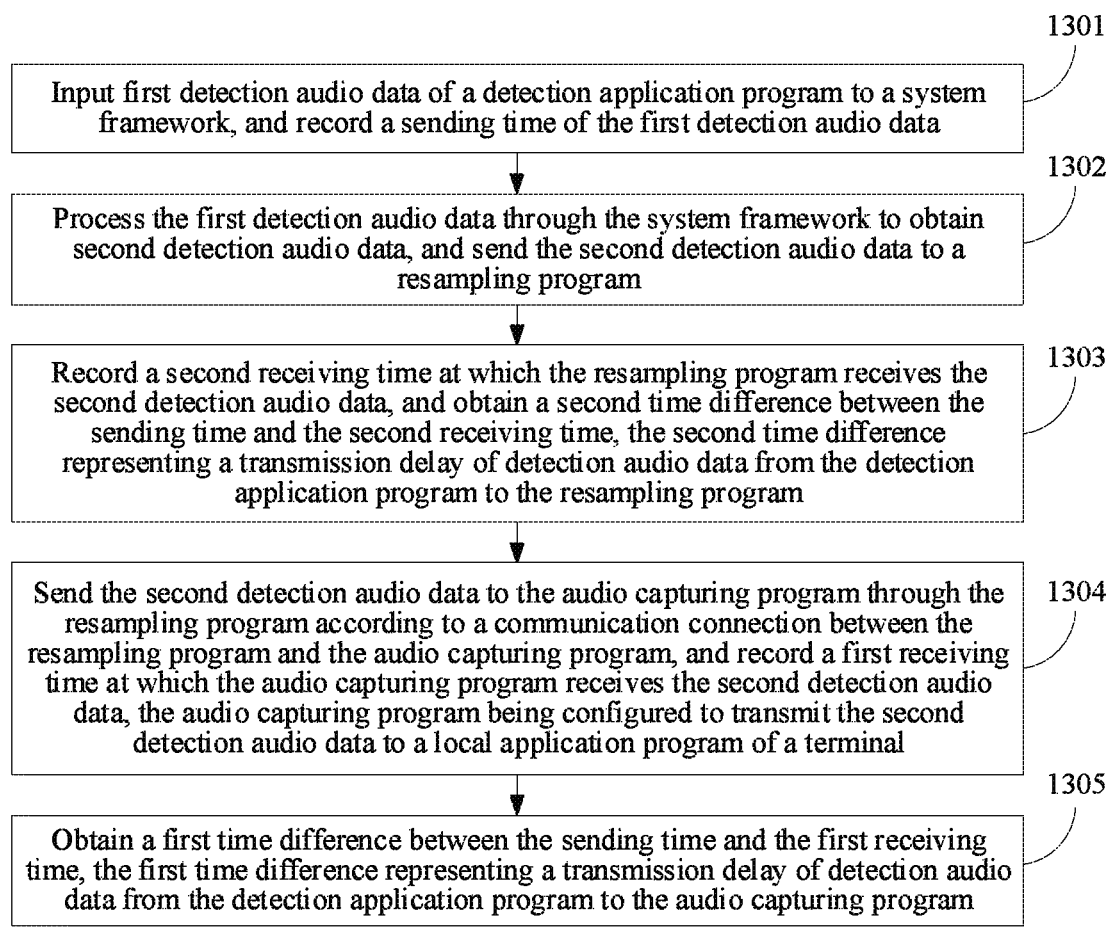
FIG. 13 is a flowchart of a delay obtaining method according to an embodiment of this application.

In some embodiments, the forwarding program in the server is a resampling program. As shown in FIG. 7, the server 700 includes a cloud application program 701, a system framework 702, a resampling program 703, and an audio capturing program 704. Based on FIG. 7, an embodiment of this application further provides a delay obtaining method, to detect a delay in delivering audio data by the server shown in FIG. 7. FIG. 13 is a flowchart of a delay obtaining method according to an embodiment of this application. This embodiment of this application is performed by the server shown in FIG. 7. Referring to FIG. 13, the method includes the following steps.

1301: Input first detection audio data of a detection application program to a system framework, and record a transmission moment of the first detection audio data.

1302: Process the first detection audio data through the system framework to obtain second detection audio data, and send the second detection audio data to a resampling program.

1303: Record a second receiving moment at which the resampling program receives the second detection audio data, and obtain a second time difference between the transmission moment and the second receiving moment, the second time difference representing a transmission delay of detection audio data from the detection application program to the resampling program.

1304: Transmit the second detection audio data to the audio capturing program through the resampling program according to a communication connection between the resampling program and the audio capturing program, and record a first receiving moment at which the audio capturing program receives the second detection audio data, the audio capturing program being configured to transmit the second detection audio data to a local application program of a terminal.

1305: Obtain a first time difference between the transmission moment and the first receiving moment, the first time difference representing a transmission delay of detection audio data from the detection application program to the audio capturing program.

Steps 1301 to 1305 are similar to steps 1101 to 1105. The only difference is that in steps 1101 to 1105, the second detection audio data is sent to the hardware abstraction layer, but in steps 1301 to 1305, the second detection audio data is sent to the resampling program.

Figure 14:
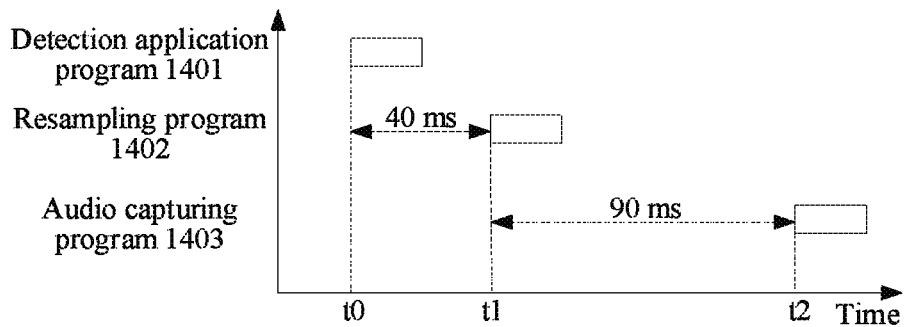
FIG. 14 is a schematic diagram of a delay in obtaining audio data by multiple programs in a server according to an embodiment of this application.

As shown in FIG. 14, in a process of actually obtaining a delay, the transmission moment at which a detection application program 1401 sends the first detection audio data is t0, and the second receiving moment at which a resampling program 1402 receives the second detection audio data is t1. The delay of the audio data from the detection application program 1401 to the resampling program 1402 is about 40 ms (milliseconds). The first receiving moment at which the audio capturing program 1403 receives the second detection audio data is t2. The delay of the audio data from the resampling program 1402 to the audio capturing program 1403 is about 0 ms. Therefore, a time consumed to obtain the audio data from the operating system by the server is controlled to be about 40 ms. This greatly shortens the time consumed to obtain the audio data by the server.

In a possible implementation, the resampling program is further configured to send the second detection audio data to a record thread. The record thread records the second detection audio data to obtain third detection audio data, and the audio capturing program reads the third detection audio data from the record thread.

In a possible implementation, the record program is further configured to record a third receiving moment at which the audio capturing program receives the third audio data, and the server obtains a third time difference between the transmission moment and the third receiving moment. The third time difference indicates a delay in transmitting the detection audio data to the audio capturing program from the detection application program through the resampling program and the record thread.

To make the recorded third receiving moment more accurate, in some embodiments, when the resampling program and the audio capturing program have not established a communication connection, a delay in transmitting the audio data to the audio capturing program after the audio data is outputted by the detection application program and passes through the resampling program and the record thread is obtained. In this way, the audio capturing program only receives the third detection audio data, and cannot receive the second detection audio data. Therefore, the obtained third receiving moment is more accurate.

Figure 15:
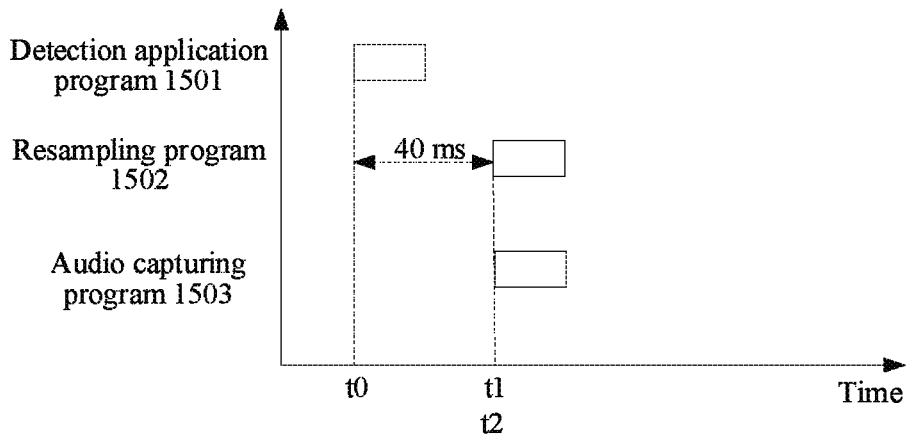
FIG. 15 is a schematic diagram of a delay in obtaining audio data by multiple programs in a server according to an embodiment of this application.

As shown in FIG. 15, in a process of actually obtaining a delay, the transmission moment at which a detection application program 1501 sends the first detection audio data is t0, and the second receiving moment at which a resampling program 1502 receives the second detection audio data is t1. The delay of the audio data from the detection application program 1501 to the resampling program 1502 is about 40 ms (milliseconds). The third receiving moment at which the audio capturing program 1503 receives the third detection audio data is t2. The delay of the audio data from the resampling program 1502 to the audio capturing program 1503 is about 90 ms.

In a possible implementation, the server not only sends audio data generated by the cloud application program to the terminal, but also sends video data generated by the cloud application program to the terminal. A delay between the audio and the video played by the terminal is detected, and it is found that the audio and the video are not synchronized and a delay from playing the video to playing the audio corresponding to the video is about 0.37 seconds. When a delay between a video and audio is higher than 0.3 seconds, the human ear can perceive an obvious delay, affecting user experience. If the audio data processing method provided in this embodiment of this application is used, a delay in delivering audio data by the server can be reduced and a delay between a video and audio can be reduced to about 0.242 seconds, so that the human ear cannot perceive an obvious delay, improving user experience.

In the delay obtaining method provided in this embodiment of this application, the detection application program sends the detection audio data, and the receiving moment at which the audio capturing program receives the detection audio data is obtained. A time consumed to transmit the audio data from the detection application program to the audio capturing program can be accurately obtained according to the time difference between the transmission moment and the receiving moment, that is, a time consumed to obtain the audio data by the server. The time may indicate a delay in delivering the audio data by the server. Subsequently, it may be determined, according to the time, whether the delay in obtaining the audio data by the server affects a playback effect of the audio data and affects a hearing effect of a user of the terminal, to determine whether to continue to improve the server. This provides desirable reference of improvement for developers.

In addition, the receiving moment at which the resampling program receives the detection audio data may be further obtained, to further obtain the time consumed to transmit the detection audio data from the detection application program to the resampling program, and the time consumed to transmit the detection audio data from the resampling program to the audio capturing program. In this way, the time consumed in each transmission stage of the audio data can be accurately obtained, so that subsequently developers can improve the server in a targeted manner.

The two audio data processing methods provided in the embodiments of this application have almost the same effect on reducing a delay in delivering audio data by the server. Table 1 shows delays between videos and audio obtained by using any audio data processing method provided in the embodiments of this application and delays between videos and audio obtained by using another audio data processing method in the related art. Table 1 is as follows:

TABLE 1

| Product | Game | Network | Delay (milliseconds) | Comparison |
| --- | --- | --- | --- | --- |
| Product A | Game a | Radio network | 206.2 | Product A is better |
| Product B | Game a | Radio network | 273.5 | than product B |
| Product A | Game b | Radio network | 242.8 | Product A is better |
| Product C | Game b | Radio network | 678.8 | than product C |
| Product A | Game a | Mobile network | 238.8 | Product A is better |
| Product B | Game a | Mobile network | 260.3 | than product B |
| Product A | Game b | Mobile network | 249.5 | Product A is better |
| Product C | Game b | Mobile network | 527.0 | than product C |

The audio data processing method provided in the embodiments of this application is used for the product A, while another audio data processing method is used for the product B and the product C. The product A, the product B, and the product C provide at least one type of game. An application program of the at least one type of game runs in a server, that is, at least one type of cloud application program runs in the server.

Figure 16:
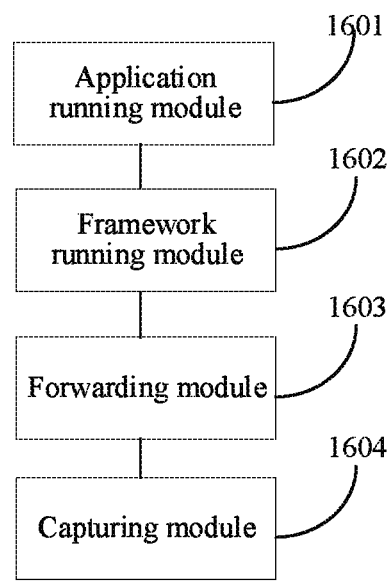
FIG. 16 is a schematic structural diagram of an audio data processing apparatus according to an embodiment of this application.

FIG. 16 is a schematic structural diagram of a server according to an embodiment of this application. Referring to FIG. 16, the server includes: an application running module 1601, a framework running module 1602, a forwarding module 1603, and a capturing module 1604.

The application running module 1601 is configured to input first audio data of a cloud application program to the framework running module 1602.

The framework running module 1602 is configured to process the first audio data to obtain second audio data and transmit the second audio data to the forwarding module 1603.

The forwarding module 1603 is configured to transmit the second audio data to the capturing module 1604 according to a communication connection between the forwarding module 1603 and the capturing module 1604, the capturing module 1604 being configured to transmit the second audio data to a local application program of a terminal.

In some embodiments, the framework running module 1602 is configured to transmit the second audio data to the forwarding module 1603 in accordance with a determination that the forwarding module 1603 and the capturing module 1604 have established a communication connection.

The framework running module 1602 is configured to: control the forwarding module 1603 to establish a communication connection to the capturing module 1604 in accordance with a determination that the forwarding module 1603 and the capturing module 1604 have not established a communication connection, and transmit the second audio data to the forwarding module 1603 in accordance with a determination that the forwarding module 1603 and the capturing module 1604 have successfully established a communication connection.

In some embodiments, the framework running module 1602 is configured to: perform audio mixing processing on the first audio data to obtain third audio data, and process the third audio data according to an audio parameter, to obtain the second audio data.

In some embodiments, the framework running module 1602 is configured to perform at least one of the following:
performing resampling processing on the third audio data according to a target sampling rate, to obtain the second audio data, where the audio parameter includes the target sampling rate;
performing channel quantity modification processing on the third audio data according to a target channel quantity, to obtain the second audio data, where the audio parameter includes the target channel quantity; and
performing resampling processing on the third audio data according to a target sampling depth, to obtain the second audio data, where the audio parameter includes the target sampling depth.

Figure 17:
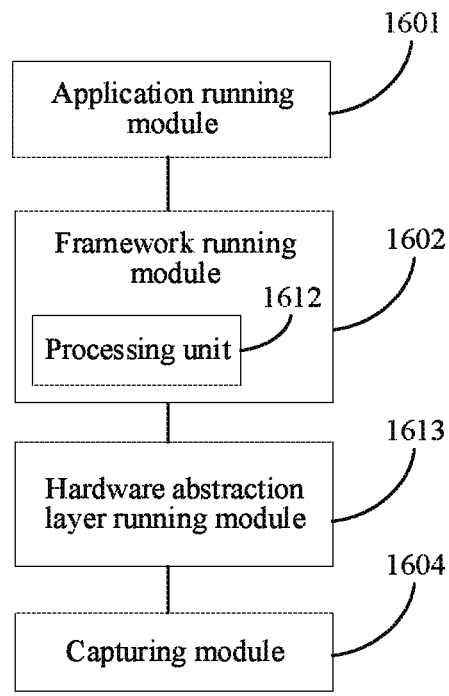
FIG. 17 is a schematic structural diagram of another audio data processing apparatus according to an embodiment of this application.

As shown in FIG. 17, in some embodiments, the framework running module 1602 includes a processing unit 1612, and the processing unit 1612 is configured to perform audio mixing processing on the first audio data to obtain the third audio data.

The processing unit 1612 is configured to process the third audio data according to the audio parameter, to obtain the second audio data.

In some embodiments, the forwarding module 1603 is a hardware abstraction layer running module 1613, and the framework running module 1602 is configured to obtain the audio parameter from the hardware abstraction layer running module 1613. The hardware abstraction layer running module 1613 stores the audio parameter.

In some embodiments, the forwarding module 1603 is a hardware abstraction layer running module 1613, and the framework running module 1602 is configured to invoke a write interface of the hardware abstraction layer running module 1613 to write the second audio data into the hardware abstraction layer running module 1613.

Figure 18:
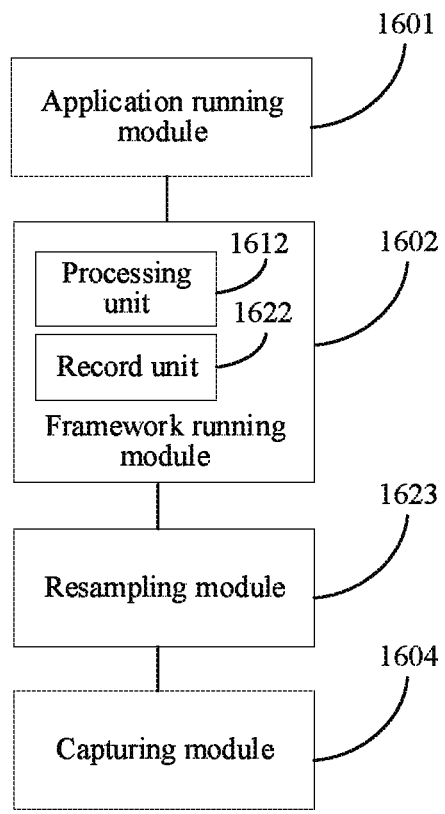
FIG. 18 is a schematic structural diagram of another audio data processing apparatus according to an embodiment of this application.

As shown in FIG. 18, in some embodiments, the forwarding module 1603 is a resampling module 1623, and the framework running module 1602 is further configured to obtain the audio parameter from the resampling module 1623. The resampling module 1623 is configured with the audio parameter.

In some embodiments, the forwarding module 1603 is a resampling module 1623.

The resampling module 1623 is further configured to perform resampling processing on the second audio data, to obtain the processed second audio data.

The resampling module 1623 is configured to send the processed second audio data to the capturing module 1604 according to a communication connection between the resampling module 1623 and the capturing module 1604.

In some embodiments, the framework running module 1602 includes a record unit 1622.

The resampling module 1623 is configured to send the second audio data to the record unit 1622.

The record unit 1622 is configured to record the second audio data to obtain the third audio data.

The capturing module 1604 is configured to invoke an audio record interface to read the third audio data from the record unit 1622.

In some embodiments, the capturing module 1604 is configured to discard the third audio data and transmit the second audio data to the local application program of the terminal.

Figure 19:
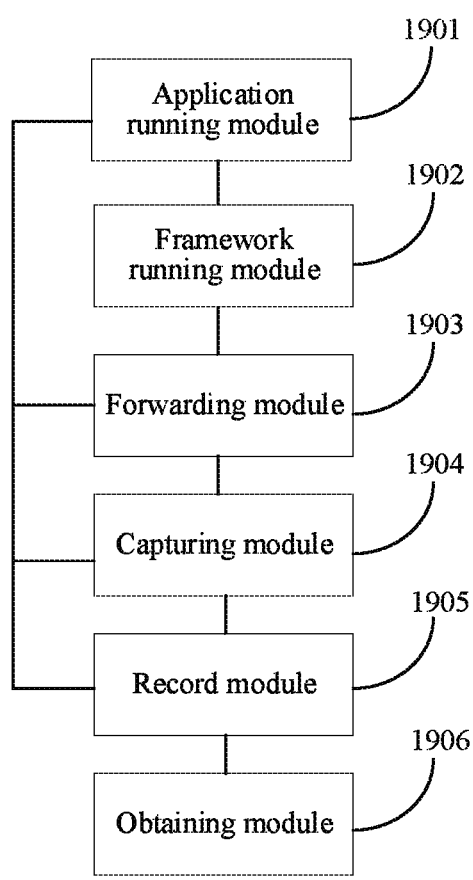
FIG. 19 is a schematic structural diagram of a delay obtaining apparatus according to an embodiment of this application.

FIG. 19 is a schematic structural diagram of a server according to an embodiment of this application. Referring to FIG. 19, the server includes: an application running module 1901, a framework running module 1902, a forwarding module 1903, a capturing module 1904, a record module 1905, and an obtaining module 1906.

The application running module 1901 is configured to input first detection audio data of a detection application program to the framework running module 1902.

The record module 1905 is configured to record a transmission moment of the first detection audio data.

The framework running module 1902 is configured to process the first detection audio data to obtain second detection audio data and transmit the second detection audio data to the forwarding module 1903.

The forwarding module 1903 is configured to transmit the second detection audio data to the capturing module 1904 according to a communication connection between the forwarding module 1903 and the capturing module 1904, the capturing module 1904 being configured to transmit the second detection audio data to a local application program of a terminal.

The record module 1905 is further configured to record a first receiving moment at which the capturing module 1904 receives the second detection audio data.

The obtaining module 1906 is configured to obtain a first time difference between the transmission moment and the first receiving moment, the first time difference representing a transmission delay of detection audio data from the application running module 1901 to the capturing module 1904.

In some embodiments, the record module 1905 is further configured to record a second receiving moment at which the forwarding module receives the second detection audio data.

The obtaining module 1906 is configured to obtain a second time difference between the transmission moment and the second receiving moment, the second time difference representing a delay in transmitting detection audio data from the application running module 1901 to the forwarding module 1903.

In some embodiments, the forwarding module 1903 is a hardware abstraction layer running module. Alternatively, the forwarding module 903 is a resampling module.

Figure 20:
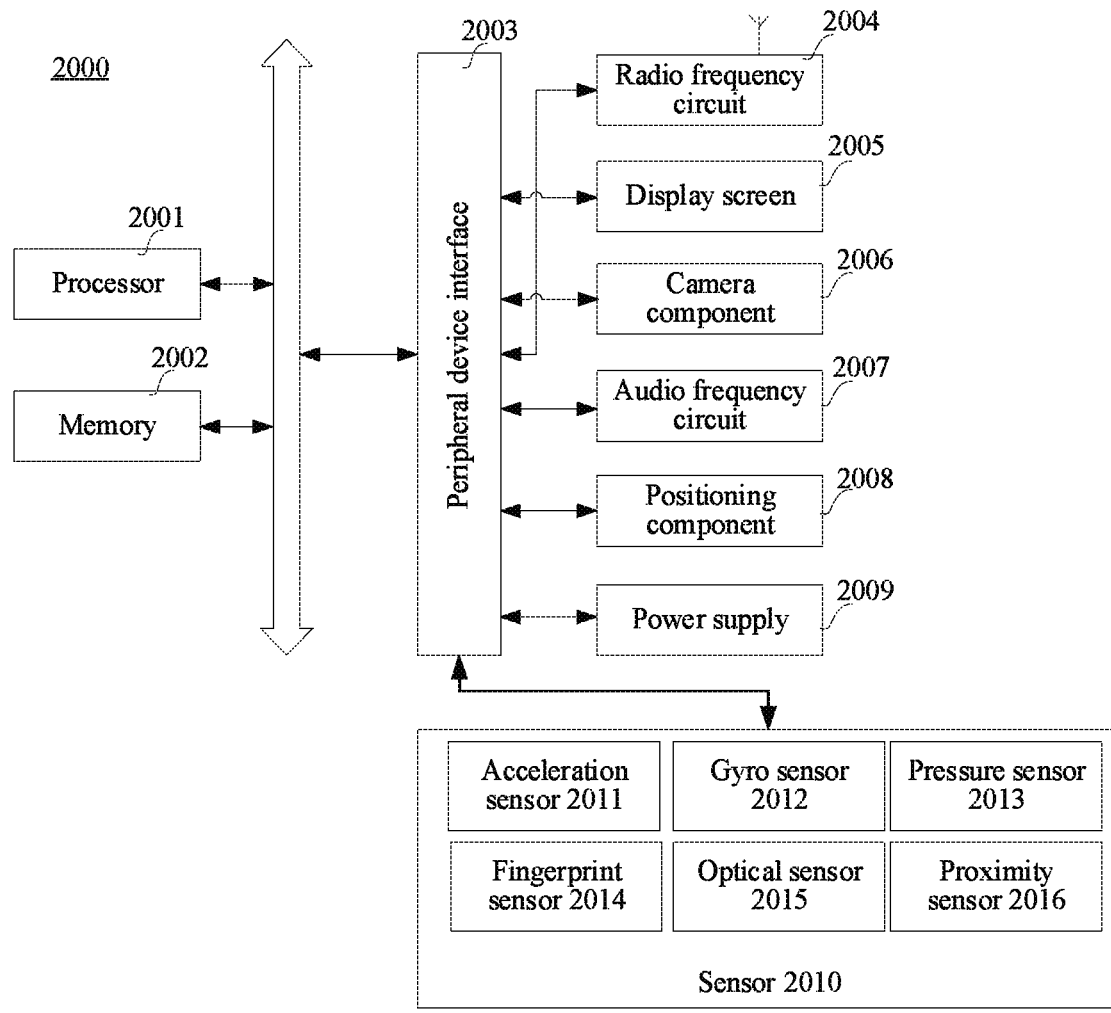
FIG. 20 is a structural block diagram of a terminal according to an embodiment of this application.

FIG. 20 is a structural block diagram of a terminal according to an embodiment of this application. The terminal 2000 is configured to perform steps performed by the terminal in the foregoing embodiment. In some embodiments, the terminal 2000 is a portable mobile terminal, for example, a smartphone, a tablet computer, a Moving Picture Experts Group Audio Layer III (MP3) player, a Moving Picture Experts Group Audio Layer IV (MP4) player, a notebook computer, or a desktop computer. The terminal 2000 may also he referred to as user equipment, a portable terminal, a laptop terminal, a desktop terminal, or by another name.

Generally, the terminal 2000 includes a processor 2001 and a memory 2002.

The processor 2001 may include one or more processing cores, and may be, for example, a 4-core processor or an 8-core processor. The processor 2001 may be implemented by using at least one hardware form of a digital signal processor (DSP), a field-programmable gate array (FPGA), or a programmable logic array (PLA). The processor 2001 may alternatively include a main processor and a coprocessor. The main processor is configured to process data in an awake state, also referred to as a central processing unit (CPU). The coprocessor is a low-power processor configured to process data in a standby state. In some embodiments, the processor 2001 may be integrated with a graphics processing unit (GPU). The GPU is configured to render and draw content that needs to be displayed on a display screen. In some embodiments, the processor 2001 may further include an AI processor. The AI processor is configured to process a computing operation related to machine learning.

The memory 2002 may include one or more computer-readable storage media. The computer-readable storage medium may be non-transient. The memory 2002 may further include a high-speed random access memory (RAM) and a nonvolatile memory, for example, one or more disk storage devices or flash storage devices. In some embodiments, a non-transitory computer-readable storage medium in the memory 2002 is configured to store at least one piece of program code. The at least one piece of program code is executed by the processor 2001 to perform the audio data processing method or the delay obtaining method provided in the method embodiments of this application.

In some embodiments, the terminal 2000 may include a peripheral interface 2003 and at least one peripheral. The processor 2001, the memory 2002, and the peripheral interface 2003 may be connected by a bus or a signal line. Each peripheral may be connected to the peripheral interface 2003 by using a bus, a signal cable, or a circuit board. Specifically, the peripheral device includes: at least one of a radio frequency (RF) circuit 2004, a display screen 2005, a camera component 2006, an audio circuit 2007, a positioning component 2008, and a power supply 2009.

A person skilled in the art may understand that the structure shown in FIG. 20 does not constitute a limitation to the terminal 2000, and the terminal may include more or fewer components than those shown in the figure, or some components may be combined, or a different component deployment may be used.

Figure 21:
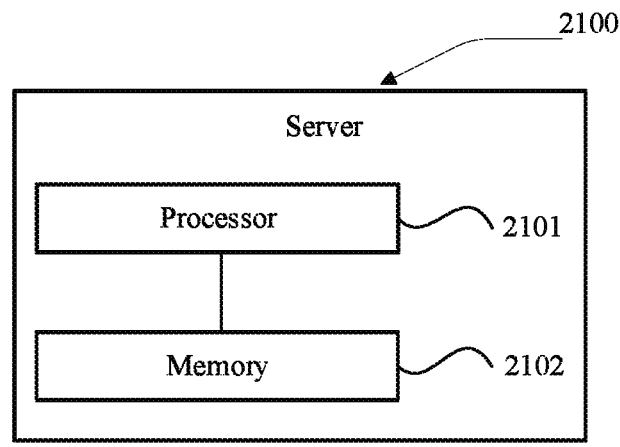
FIG. 21 is a schematic structural diagram of a server according to an embodiment of this application.

FIG. 21 is a schematic structural diagram of a server according to an embodiment of this application. The server 2100 may vary greatly due to different configurations or performance, and may include one or more central processing units (CPU) 2101 and one or more memories 2102. The memory 2102 stores at least one piece of program code, the at least one piece of program code being loaded and executed by the processor 2101 to implement the methods provided in the foregoing method embodiments. Certainly, the device can also have a wired or wireless network interface, a keyboard, an I/O interface and other components to facilitate I/O. The device can also include other components for implementing device functions. Details are not described herein again.

The server 2100 may be configured to perform steps performed by the server in the foregoing audio data processing method; or configured to perform steps performed by the server in the foregoing delay obtaining method.

An embodiment of this application further provides a computer device. The computer device includes a processor and a memory. The memory stores at least one piece of program code. The at least one piece of program code is loaded and executed by the processor to perform operations in the audio data processing method in the foregoing embodiments; or perform operations in the delay obtaining method in the foregoing embodiments.

In addition, an embodiment of this application further provides a storage medium. The storage medium is configured to store a computer program. The computer program is configured to perform the methods provided in the foregoing embodiments.

An embodiment of this application further provides a computer program product including instructions. When the computer program product runs on a computer, the computer is caused to perform the methods provided in the foregoing embodiments.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The foregoing descriptions are merely exemplary embodiments of this application, but are not intended to limit this application. Any modification, equivalent replacement, or improvement made within the spirit and principle of this application shall fall within the protection scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor tor processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs audio forwarding and/or resampling. In practical application, the foregoing functions may be allocated to and completed by different functional modules according to requirements, that is, an inner structure of a device is divided into different functional modules to implement all or a part of the functions described above.

What is claimed is:

1. An audio data processing method performed at a server that includes a cloud application program, a system framework, a forwarding program, and an audio capturing program, the method comprising:
inputting first audio data of the cloud application program to the system framework;
processing the first audio data through the system framework to obtain second audio data, and transmitting the second audio data to the forwarding program by invoking a write interface of the forwarding program through the system framework and writing the second audio data to the forwarding program through the write interface; and
transmitting the second audio data from the forwarding program to the audio capturing program according to a communication connection between the forwarding program and the audio capturing program, the audio capturing program being configured to transmit the second audio data to a local application program installed on a terminal.

2. The method according to claim 1, wherein the communication connection between the forwarding program and the audio capturing program is a socket connection, and the forwarding program and the audio capturing program run in a same container of the server.

3. The method according to claim 1, wherein transmitting the second audio data to the forwarding program comprises:
transmitting the second audio data to the forwarding program in accordance with a determination that the forwarding program and the audio capturing program have established a communication connection; or
in accordance with a determination that the forwarding program and the audio capturing program have not established a communication connection:
controlling the forwarding program to establish a communication connection to the audio capturing program; and
transmitting the second audio data to the forwarding program after the forwarding program and the audio capturing program have successfully established a communication connection.

4. The method according to claim 1, wherein processing the first audio data using the system framework to obtain the second audio data comprises:
performing audio mixing processing on the first audio data through the system framework to obtain third audio data; and
processing the third audio data through the system framework according to an audio parameter, to obtain the second audio data.

5. The method according to claim 4, wherein processing the third audio data through the system framework according to the audio parameter, to obtain the second audio data comprises at least one of the following:
performing resampling processing on the third audio data through the system framework according to a target sampling rate, to obtain the second audio data, wherein the audio parameter comprises the target sampling rate;
performing channel quantity modification processing on the third audio data through the system framework according to a target channel quantity, to obtain the second audio data, wherein the audio parameter comprises the target channel quantity; and
performing resampling processing on the third audio data through the system framework according to a target sampling depth, to obtain the second audio data, wherein the audio parameter comprises the target sampling depth.

6. The method according to claim 4, wherein the system framework comprises a processing thread, and performing the audio mixing processing on the first audio data through the system framework to obtain the third audio data comprises:
performing audio mixing processing on the first audio data through the processing thread to obtain the third audio data; and
the processing the third audio data through the system framework according to an audio parameter, to obtain the second audio data comprises:
processing the third audio data through the processing thread according to the audio parameter, to obtain the second audio data.

7. The method according to claim 4, wherein the forwarding program is a hardware abstraction layer, and before the processing the third audio data through the system framework according to an audio parameter, to obtain the second audio data, the method further comprises:
obtaining the audio parameter through the system framework from the hardware abstraction layer, wherein the hardware abstraction layer stores the audio parameter.

8. The method according to claim 1, wherein the forwarding program is a resampling program, and the transmitting the second audio data to the audio capturing program through the forwarding program according to a communication connection between the forwarding program and the audio capturing program comprises:
performing resampling processing on the second audio data through the resampling program, to obtain the processed second audio data; and
transmitting the processed second audio data to the audio capturing program through the resampling program according to a communication connection between the resampling program and the audio capturing program.

9. The method according to claim 1, wherein the forwarding program is a resampling program, the system framework comprises a record thread, and after the transmitting the second audio data to the forwarding program, the method further comprises:
transmitting the second audio data to the record thread through the resampling program;
recording the second audio data through the record thread to obtain the third audio data; and
invoking an audio record interface to read the third audio data from the record thread through the audio capturing program.

10. The method according to claim 9, the method further comprising:

discarding the third audio data and transmitting the second audio data to the local application program of the terminal through the audio capturing program.

11. The method according to claim 1, wherein the server further includes a detection application program, the method further comprising:
inputting first detection audio data of the detection application program to the system framework, and recording a transmission moment of the first detection audio data;
processing the first detection audio data through the system framework to obtain second detection audio data, and transmitting the second detection audio data to the forwarding program; and
transmitting the second detection audio data to the audio capturing program through the forwarding program according to a communication connection between the forwarding program and the audio capturing program, and recording a first receiving moment at which the audio capturing program receives the second detection audio data, the audio capturing program being configured to transmit the second detection audio data to a local application program of a terminal; and
obtaining a first time difference between the transmission moment and the first receiving moment, the first time difference representing a transmission delay of detection audio data from the detection application program to the audio capturing program.

12. The method according to claim 11, wherein after the transmitting the second detection audio data to the forwarding program, the method further comprises:
recording a second receiving moment at which the forwarding program receives the second detection audio data; and
obtaining a second time difference between the transmission moment and the second receiving moment, the second time difference representing a transmission delay of detection audio data from the detection application program to the forwarding program.

13. A server system, comprising:
one or more processors; and
memory storing one or more programs, the one or more programs comprising instructions that, when executed by the one or more processors, cause the one or more processors to perform operations comprising:
inputting first audio data of the cloud application program to the system framework;
processing the first audio data through the system framework to obtain second audio data, and transmitting the second audio data to the forwarding program by invoking a write interface of the forwarding program through the system framework and writing the second audio data to the forwarding program through the write interface; and
transmitting the second audio data from the forwarding program to the audio capturing program according to a communication connection between the forwarding program and the audio capturing program, the audio capturing program being configured to transmit the second audio data to a local application program of a terminal.

14. The server system according to claim 13, wherein the communication connection between the forwarding program and the audio capturing program is a socket connection, and the forwarding program and the audio capturing program run in a same container of the server.

15. The server system according to claim 13, wherein transmitting the second audio data to the forwarding program comprises:
transmitting the second audio data to the forwarding program in accordance with a determination that the forwarding program and the audio capturing program have established a communication connection; or
in accordance with a determination that the forwarding program and the audio capturing program have not established a communication connection:
controlling the forwarding program to establish a communication connection to the audio capturing program; and
transmitting the second audio data to the forwarding program after the forwarding program and the audio capturing program have successfully established a communication connection.

16. The server system according to claim 13, wherein processing the first audio data using the system framework to obtain the second audio data comprises:
performing audio mixing processing on the first audio data through the system framework to obtain third audio data; and
processing the third audio data through the system framework according to an audio parameter, to obtain the second audio data.

17. The server system according to claim 16, wherein processing the third audio data through the system framework according to the audio parameter, to obtain the second audio data comprises at least one of the following:
performing resampling processing on the third audio data through the system framework according to a target sampling rate, to obtain the second audio data, wherein the audio parameter comprises the target sampling rate;
performing channel quantity modification processing on the third audio data through the system framework according to a target channel quantity, to obtain the second audio data, wherein the audio parameter comprises the target channel quantity; and
performing resampling processing on the third audio data through the system framework according to a target sampling depth, to obtain the second audio data, wherein the audio parameter comprises the target sampling depth.

18. The server system according to claim 16, wherein the system framework comprises a processing thread, and performing the audio mixing processing on the first audio data through the system framework to obtain the third audio data comprises:
performing audio mixing processing on the first audio data through the processing thread to obtain the third audio data; and
the processing the third audio data through the system framework according to an audio parameter, to obtain the second audio data comprises:
processing the third audio data through the processing thread according to the audio parameter, to obtain the second audio data.

19. A non-transitory computer-readable storage medium, storing a computer program, the computer program, when executed by one or more processors of a server system, cause the one or more processors to perform operations comprising:
inputting first audio data of the cloud application program to the system framework;
processing the first audio data through the system framework to obtain second audio data, and transmitting the second audio data to the forwarding program by invoking a write interface of the forwarding program through the system framework and writing the second audio data to the forwarding program through the write interface; and transmitting the second audio data from the forwarding program to the audio capturing program according to a communication connection between the forwarding program and the audio capturing program, the audio capturing program being configured to transmit the second audio data to a local application program of a terminal.

* * * * *